United States Patent
Weissman et al.

(10) Patent No.: US 10,649,995 B2
(45) Date of Patent: *May 12, 2020

(54) METHODS AND SYSTEMS FOR OPTIMIZING QUERIES IN A MULTI-TENANT STORE

(71) Applicant: Salesforce.com, Inc., San Francisco, CA (US)

(72) Inventors: Craig Weissman, San Francisco, CA (US); James Taylor, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 286 days.

This patent is subject to a terminal disclaimer.

(21) Appl. No.: 15/344,340

(22) Filed: Nov. 4, 2016

(65) Prior Publication Data

US 2017/0116274 A1    Apr. 27, 2017

Related U.S. Application Data

(63) Continuation of application No. 13/868,746, filed on Apr. 23, 2013, now Pat. No. 9,507,822, which is a
(Continued)

(51) Int. Cl.
*G06F 16/00* (2019.01)
*G06F 16/2453* (2019.01)
(Continued)

(52) U.S. Cl.
CPC ........ *G06F 16/24544* (2019.01); *G06F 16/24* (2019.01); *G06F 16/242* (2019.01);
(Continued)

(58) Field of Classification Search
CPC ......... G06F 17/30463; G06F 17/30451; G06F 17/30457; G06F 17/3046; G06F 17/30471;
(Continued)

(56) References Cited

U.S. PATENT DOCUMENTS 5,091,852 A    2/1992 Tsuchida et al.
5,379,419 A *  1/1995 Heffernan ............. G06F 16/284
(Continued)

FOREIGN PATENT DOCUMENTS

CN    101430688    5/2009
EP    5819251    10/1998
(Continued)

OTHER PUBLICATIONS

Mostafa Elhemali et al., "Execution Strategies for SQL Subqueries", SIGMOD'07, Beijing, China, ACM Jun. 12-14, 2007, pp. 993-1004.*
(Continued)

*Primary Examiner* — Srirama Channavajjala
(74) *Attorney, Agent, or Firm* — Elliot, Ostrander & Preston, P.C.

(57) ABSTRACT

Methods and systems for optimizing queries in a multi-tenant store are described. In one embodiment, such a method includes retrieving data from a multi-tenant database system having a relational data store and a non-relational data store, receiving a request specifying data to be retrieved, retrieving one or more locations of the data to be retrieved, generating a database query based on the request, in which the database query specifies a plurality of data elements to be retrieved, the plurality of data elements including one or more data elements residing within the non-relational data store and one or more other data elements residing within the relational data store, generating an
(Continued)

optimized database query having an optimized query syntax that is distinct from a query syntax of the database query, and executing the optimized database query against the multi-tenant database system to retrieve the data.

19 Claims, 9 Drawing Sheets

Related U.S. Application Data continuation of application No. 12/973,676, filed on Dec. 20, 2010, now Pat. No. 8,447,754.

(60) Provisional application No. 61/325,951, filed on Apr. 20, 2010, provisional application No. 61/325,709, filed on Apr. 19, 2010.

(51) Int. Cl.
*G06F 16/24* (2019.01)
*G06F 16/242* (2019.01)
*G06F 16/25* (2019.01)
*G06F 16/2455* (2019.01)
*G06F 16/2457* (2019.01)

(52) U.S. Cl.
CPC ...... *G06F 16/2425* (2019.01); *G06F 16/2453* (2019.01); *G06F 16/2455* (2019.01); *G06F 16/24534* (2019.01); *G06F 16/24537* (2019.01); *G06F 16/24578* (2019.01); *G06F 16/256* (2019.01)

(58) Field of Classification Search
CPC ......... G06F 17/30466; G06F 17/30595; G06F 17/30422; G06F 17/30498; G06F 17/30935; G06F 16/2455; G06F 16/242; G06F 16/24539; G06F 16/2471; G06F 16/24542; G06F 16/284; G06F 16/24544; G06F 16/24565; G06F 16/30; G06F 16/24535; G06F 16/9024; G06F 16/289
See application file for complete search history.

(56) References Cited

U.S. PATENT DOCUMENTS

| | | |
|---|---|---|
| 5,577,188 A | 11/1996 | Zhu |
| 5,584,024 A | 12/1996 | Shwartz |
| 5,598,559 A | 1/1997 | Chaudhuri |
| 5,608,872 A | 3/1997 | Schwartz et al. |
| 5,608,904 A | 3/1997 | Chaudhuri et al. |
| 5,649,104 A | 7/1997 | Carleton et al. |
| 5,668,987 A | 9/1997 | Schneider |
| 5,715,450 A | 2/1998 | Ambrose et al. |
| 5,761,419 A | 6/1998 | Schwartz et al. |
| 5,819,038 A | 10/1998 | Carleton et al. |
| 5,819,251 A * | 10/1998 | Kremer ............... G06F 16/284 |
| 5,821,937 A | 10/1998 | Tonelli et al. |
| 5,829,006 A * | 10/1998 | Parvathaneny ....... G06F 16/289 |
| 5,831,610 A | 11/1998 | Tonelli et al. |
| 5,864,842 A | 1/1999 | Pederson et al. |
| 5,873,096 A | 2/1999 | Lim et al. |
| 5,918,159 A | 6/1999 | Fomukong et al. |
| 5,963,953 A | 10/1999 | Cram et al. |
| 6,006,234 A | 12/1999 | Govindarajan et al. |
| 6,029,163 A | 2/2000 | Ziauddin |
| 6,061,676 A | 5/2000 | Srivastava et al. |
| 6,092,061 A * | 7/2000 | Choy ................ G06F 16/2282 |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| 6,341,281 B1 | 1/2002 | MacNicol et al. |
| D454,139 S | 3/2002 | Feldcamp |
| 6,360,214 B1 | 3/2002 | Ellis et al. |
| 6,367,077 B1 | 4/2002 | Brodersen et al. |
| 6,370,524 B1 | 4/2002 | Witkowski |
| 6,385,603 B1 | 5/2002 | Chen et al. |
| 6,393,605 B1 | 5/2002 | Loomans |
| 6,405,220 B1 | 6/2002 | Brodersen et al. |
| 6,411,951 B1 | 6/2002 | Galindo-Legaria et al. |
| 6,434,550 B1 | 8/2002 | Warner et al. |
| 6,446,089 B1 | 9/2002 | Brodersen et al. |
| 6,457,003 B1 | 9/2002 | Gajda et al. |
| 6,477,534 B1 | 11/2002 | Acharya et al. |
| 6,529,896 B1 * | 3/2003 | Leung ............... G06F 17/30451 |
| 6,535,909 B1 | 3/2003 | Rust |
| 6,549,908 B1 | 4/2003 | Loomans |
| 6,553,371 B2 | 4/2003 | Gutierrez-Rivas et al. |
| 6,553,563 B2 | 4/2003 | Ambrose et al. |
| 6,560,461 B1 | 5/2003 | Fomukong et al. |
| 6,567,802 B1 | 5/2003 | Popa et al. |
| 6,574,635 B2 | 6/2003 | Stauber et al. |
| 6,574,639 B2 | 6/2003 | Carey et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,563 B1 | 3/2004 | Koskas |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,652 B2 * | 6/2004 | Bestgen ............ G06F 17/30463 |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,847,962 B1 * | 1/2005 | Cochrane .......... G06F 17/30457 |
| 6,850,895 B2 | 2/2005 | Brodersen et al. |
| 6,850,949 B2 | 2/2005 | Warner et al. |
| 6,983,275 B2 | 6/2006 | Koo et al. |
| 7,080,062 B1 * | 7/2006 | Leung ............... G06F 17/30463 |
| 7,233,939 B1 * | 6/2007 | Ziauddin .......... G06F 17/30442 707/718 |
| 7,461,077 B1 | 2/2008 | Greenwood |
| 7,340,411 B2 | 3/2008 | Cook |
| 7,343,367 B2 | 3/2008 | Muras et al. |
| 7,356,526 B2 * | 4/2008 | Gao ................ G06F 16/24547 |
| 7,487,140 B2 | 2/2009 | Chen et al. |
| 7,529,728 B2 | 5/2009 | Weissman et al. |
| 7,590,620 B1 | 9/2009 | Pike et al. |
| 7,620,655 B2 | 11/2009 | Larsson et al. |
| 7,653,652 B2 | 1/2010 | Kagalwala et al. |
| 7,779,039 B2 | 8/2010 | Weissman et al. |
| 7,962,448 B2 | 6/2011 | Creamer et al. |
| 7,984,043 B1 * | 7/2011 | Waas ................ G06F 16/8358 707/718 |
| 8,065,329 B2 * | 11/2011 | Lei ..................... G06F 21/6227 707/783 |

(56) References Cited

U.S. PATENT DOCUMENTS

| | | | |
|---|---|---|---|
| 8,275,763 B2 | 9/2012 | Weissman et al. | |
| 8,280,875 B2 | 10/2012 | Weissman et al. | |
| 8,335,781 B2 | 12/2012 | Weissman et al. | |
| 8,402,028 B2 | 3/2013 | Weissman | |
| 8,447,754 B2 | 5/2013 | Weissman et al. | |
| 8,898,145 B2 | 11/2014 | Wang et al. | |
| 9,053,210 B2* | 6/2015 | Elnikety | G06F 16/9024 |
| 9,507,822 B2* | 11/2016 | Weissman | G06F 16/24544 |
| 2001/0044791 A1 | 11/2001 | Richter et al. | |
| 2001/0056428 A1 | 12/2001 | Gajda et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0107840 A1 | 8/2002 | Rishe | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2002/0194167 A1 | 12/2002 | Bakalash et al. | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0055830 A1 | 3/2003 | Gutierrez-Rivas et al. | |
| 2003/0066031 A1 | 4/2003 | Laane | |
| 2003/0066032 A1 | 4/2003 | Ramachadran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0088558 A1* | 5/2003 | Zaharioudakis | G06F 16/24539 |
| 2003/0093415 A1 | 5/2003 | Larson et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0208461 A1 | 11/2003 | Messinger et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0243799 A1 | 12/2004 | Hacigumus et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0033730 A1* | 2/2005 | Chaudhuri | G06F 16/24545 |
| 2005/0049992 A1* | 3/2005 | Gupta | G06F 17/30315 |
| 2005/0050555 A1 | 3/2005 | Exley et al. | |
| 2005/0065911 A1 | 3/2005 | Ellis et al. | |
| 2005/0071331 A1* | 3/2005 | Gao | G06F 17/30471 |
| 2005/0091098 A1 | 4/2005 | Brodersen et al. | |
| 2006/0026115 A1* | 2/2006 | Ahmed | G06F 17/30451 |
| 2006/0173804 A1* | 8/2006 | Desai | G06F 16/2443 |
| 2006/0200451 A1* | 9/2006 | Kosuru | G06F 17/30466 |
| 2007/0124276 A1 | 5/2007 | Weissman et al. | |
| 2007/0130137 A1 | 6/2007 | Oliver et al. | |
| 2007/0214104 A1 | 9/2007 | Miao et al. | |
| 2007/0226176 A1* | 9/2007 | Bestgen | G06F 16/2246 |
| 2008/0033914 A1 | 2/2008 | Cherniack et al. | |
| 2008/0162412 A1* | 7/2008 | Ireland | G06F 17/3048 |
| 2008/0177716 A1* | 7/2008 | Hejlsberg | G06F 16/24552 |
| 2008/0189239 A1 | 8/2008 | Bawa et al. | |
| 2009/0077054 A1 | 3/2009 | Muras et al. | |
| 2009/0164447 A1 | 6/2009 | Daya | |
| 2009/0222404 A1 | 9/2009 | Dolin et al. | |
| 2009/0276395 A1 | 11/2009 | Weissman et al. | |
| 2009/0282045 A1 | 11/2009 | Hsieh et al. | |
| 2010/0005077 A1 | 1/2010 | Krishnamurthy et al. | |
| 2010/0211619 A1 | 8/2010 | Weissman et al. | |
| 2011/0196827 A1 | 8/2011 | Zunger | |
| 2011/0258179 A1 | 10/2011 | Weissman et al. | |
| 2012/0310916 A1* | 12/2012 | Abadi | G06F 16/2456 707/713 |
| 2012/0317096 A1 | 12/2012 | Kaufmann et al. | |
| 2017/0351735 A1* | 12/2017 | Bruno | G06F 16/2453 |

FOREIGN PATENT DOCUMENTS

| | | |
|---|---|---|
| EP | 6457003 | 9/2002 |
| JP | 2001051879 | 2/2001 |
| WO | WO-2004036365 | 4/2004 |
| WO | WO-2010091191 | 8/2010 |

OTHER PUBLICATIONS

Office Action for U.S. Appl. No. 12/973,676 dated Jul. 24, 2012, 24 pages.

"Join sequence optimization in Parallel Query Plans," by Langer et al., IEEE 1996, 8 pages.

"Join Optimization of Information Extraction Output: Quality Matters!," by Jain et al., 2009 IEEE, 12 pages.

"Semantic information-based alternative plan generation for multiple query optimization," by Faruk Polat et al., Information Science 137 dated 2001, 31 pages.

Notice of Allowance for U.S. Appl. No. 12/973,676 dated Jan. 29, 2013, 24 pages.

Office Action for U.S. Appl. No. 12/973,668 dated May 23, 2013, 18 pages.

International Preliminary Report on Patentability for Application No. PCT/US11/32631 dated Jun. 25, 2013, 8 pages.

Office Action for Application No. 2013-546104 dated Jul. 23, 2014, 9 pages.

"Real image of a foundation disclosed by a designer who analyzes the latest cloud technology," Nikkei Computer, Japan, Nikkei BP Inc., Sep. 1, 2010, No. 764, 9 pages.

"Design theory of cloud," Masayoshi Hagiwara, Nikkei Systems, Japan, Nikkei BP Inc., Nov. 26, 2010, No. 212, 10 pages.

Office Action for U.S. Appl. No. 13/868,746 dated Jul. 28, 2014, 18 pages.

Final Office Action for U.S. Appl. No. 13/868,746 dated Dec. 29, 2014, 28 pages.

"Implementation of NOSQL for Robotics," by Vijaykumar et al., 2010 IEEE, 6 pages.

First Office Action for Chinese Patent Application No. 201180061441.7 dated May 5, 2015, 24 pages.

Office Action for U.S. Appl. No. 13/868,746 dated Jun. 23, 2015, 32 pages.

Uma Bhat et al. "Moving Towards Non-Relational Databases", 2010 International Journal of computer Applications, vol. 1, No. 13, pp. 40-46, 7 pages.

Final Office Action for U.S. Appl. No. 13/868,746 dated Oct. 16, 2015, 33 pages.

Extended European Search Report for European Patent Application No. 11850646.8 dated Jul. 2, 2015, 8 pages.

Notice of Allowance for Chinese Patent Application No. 201180061441.7, dated Feb. 4, 2016, 2 pages.

Non-Final Office Action for U.S. Appl. No. 13/868,746, dated Apr. 12, 2016, 27 pages.

(56) References Cited

OTHER PUBLICATIONS

Office Action for Japanese Patent Application No. 2015-042121, dated Mar. 29, 2016, 6 pages.
Exam Report for Australian Patent Application No. 2011345318, dated Jun. 3, 2016, 3 pages.
Non-Final Office Action for U.S. Appl. No. 12/973,668, dated Nov. 22, 2016, 26 pages.
Office Action for U.S. Appl. No. 12/973,668 dated Aug. 31, 2012, 19 pages.
International Search Report and Written Opinion for Application No. PCT/US2011/032781 dated Nov. 28, 2011, 10 pages.
International Preliminary Report on Patentability for Application No. PCT/US2011/032781 dated Oct. 16, 2012, 9 pages.
International Search Report and Written Opinion for Application No. PCT/US11/32631 dated Dec. 1, 2011, 7 pages.
Office Action for U.S. Appl. No. 2013-546104 dated Jul. 23, 2014, 9 pages.
Office Action for Canadian Application No. 2,820,867, dated Feb. 15, 2017, 5 pages.
Communication Under Rule 71(3) EPC—Intent to Grant for European Patent Application No. 11850646.8, dated Oct. 23, 2018, 7 pages.
European Search Report for Application No. 19166628.8 dated Aug. 28, 2019, 5 pages.
Examination Report for Australian Patent Application No. 2011345318, dated Jun. 3, 2016, 3 pages.
Final Office Action for U.S. Appl. No. 12/973,668, dated Jun. 2, 2017, 33 pages.
Final Office Action for U.S. Appl. No. 12/973,668, dated May 23, 2013, 18 pages.
First Examination for Indian Application No. 5199/CHENP/2013, dated Mar. 29, 2019, 6 pages.
International Preliminary Report on Patentability for International Patent Application No. PCT/US11/32631, dated Nov. 13, 2011, 8 pages.
Notice of Acceptance for Australian Patent Application No. 2011345318, dated Jun. 5, 2017, 4 pages.
Notice of Allowance for U.S. Appl. No. 13/868,746 dated Aug. 23, 2016, 24 pages.
Notice of Allowance for Application No. 2,820,867, dated Nov. 7, 2019, 1 page.
Notice of Allowance for Application No. 201610244849.2 dated Apr. 26, 2019, 4 pages.
Notice of Allowance for Japanese Application No. 2016-238650 dated Oct. 9, 2018, 3 pages.
Notice of Allowance for U.S. Appl. No. 12/973,668, dated Aug. 27, 2018, 8 pages.
Notice of Grant for Japanese Application No. 2013-546104, dated Feb. 5, 2015, 3 pages.
Notice of Rejection for Application No. 2016-238650 dated Jan. 23, 2018, 9 pages.
Notification of Grant for Chinese Patent Application No. 201180061441.7, dated Feb. 4, 2016, 2 pages.
Office Action for Application No. 2,820,867 dated Mar. 14, 2018, 21 pages.
Office Action for Application No. 201610244849.2 dated Sep. 18, 2018, 10 pages.
Office Action for Canadian Patent Application No. 2820867.000, dated Feb. 15, 2017, 5 pages.
Office Action for Canadian Patent Application No. 2820867.000, dated Mar. 14, 2018, 21 pages.
Office Action for Chinese Patent Application No. 201180061441.7, dated May 5, 2015, 15 pages.
Office Action for Chinese Patent Application No. 201610244849.2, dated Sep. 18, 2018, 4 pages.
Office Action for Japanese Patent Application No. 2016-238650, dated Jan. 23, 2018, 9 pages.
Second Exam Report for Australian Patent Application No. 2011345318, dated Feb. 14, 2017, 3 pages.

\* cited by examiner

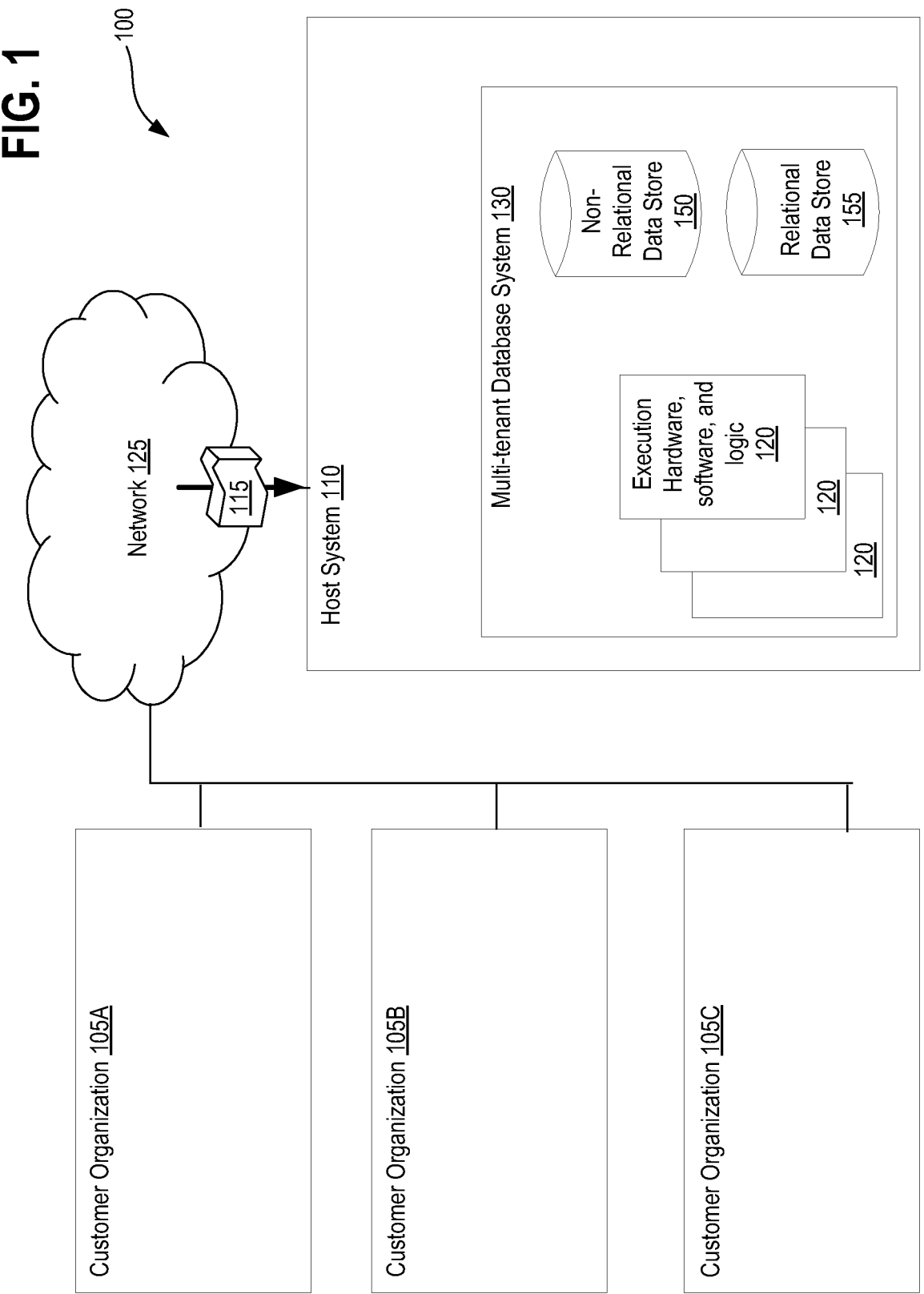

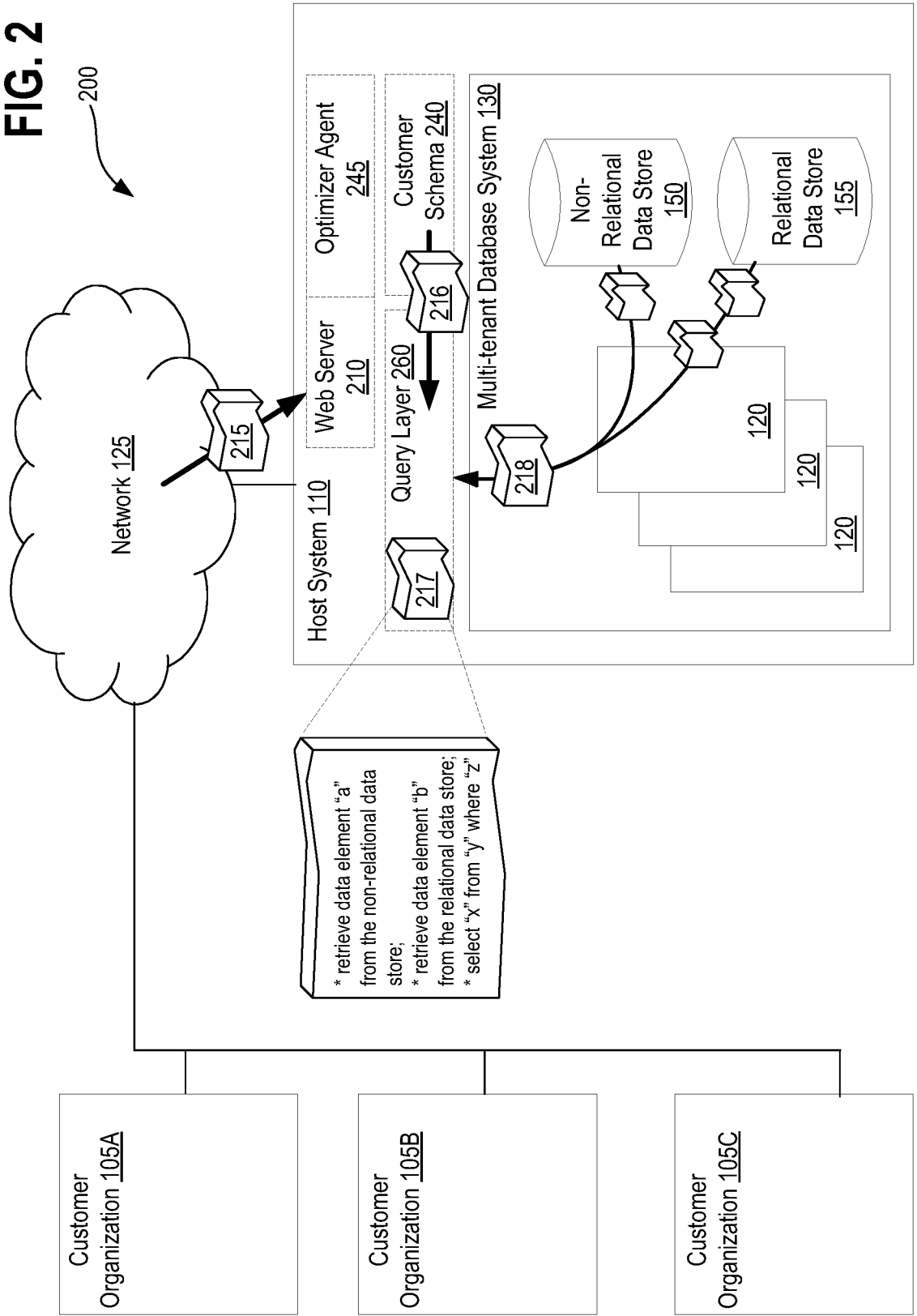

FIG. 7A 700

| Query | Original Query | Optimized Query | Optimization Notes |
|---|---|---|---|
| 705 | SELECT * FROM Employee e WHERE salary < 50 | SELECT e.* FROM Employee.1 i, Employee e WHERE i.Id > 0x0 AND i.Id < 50 | A non inclusive lower bound key against a null value is selected since null salary values would be at the beginning and may be filtered out. |
| 710 | SELECT * FROM Employee e WHERE salary >= 50 | SELECT e.* FROM Employee.1 i, Employee e WHERE STARTS_WITH(i.Id,50) | An upper bound key is selected since null salary values would be at the beginning. |
| 715 | SELECT * FROM Employee e WHERE salary = 50 AND hire_date > '01-01-2009' | SELECT e.* FROM Employee.1 i, Employee e WHERE i.Id > 50 0x0 2009-01-01 AND STARTS_WITH(i.Id, 50 0x0) | An 0x0 separator byte is appended to the salary value because of the equality expression. The STARTS_WITH operand terminates the range scan when salary values greater than 50 are encountered. |
| 720 | SELECT * FSELECT * FROM Employee e WHERE salary = 50 AND hire_date < '01-01-2009'ROM Employee e WHERE salary >= 50 | SELECT e.* FROM Employee.1 i, Employee e WHERE STARTS_WITH(i.Id, 50 0x0) AND i.Id < 50 0x0 2009-01-01 | An 0x0 separator byte is appended to the salary value because of the equality expression. The STARTS_WITH operand terminates the range scan when salary values less than 50 are encountered. |

FIG. 7B

| Query | Original Query | Optimized Query | Optimization Notes |
|---|---|---|---|
| 725 | SELECT Id FROM Employee e WHERE salary = 50 AND hire_date = '03-01-2009' | SELECT EXTRACT(i.Id) FROM Employee.1 i WHERE STARTS_WITH(i.Id,50 0x0 2009-03-01 0x0) | A join against the data table negated because only the PK (primary key) is returned. The EXTRACT operand extracts the PK from the index key. The STARTS_WITH is used and the 0x0 separator byte is appended after each value since only equality expressions are specified. |
| 730 | SELECT * FROM Employee e WHERE salary IS NULL AND hire_date > '01-01-2005' AND hire_date <= '01-01-2006' | SELECT e.* FROM Employee.1 i, Employee e WHERE i.Id > 0x0 2005-01-01 AND STARTS_WITH(i.Id, 0x0 2006-01-0) | The empty byte value is selected because of the NULL salary column value check. The STARTS_WITH is selected because of the <= expression. |
| 735 | SELECT * FROM Employee e WHERE salary >= 50 AND hire_date < '12-31-2008' | SELECT e.* FROM Employee.1 i, Employee e WHERE STARTS_WITH(i.Id, 50) | Here, only the salary column filter expression is part of the key. The hire_date expression may thus be evaluated afterwards on the matching rows via a following sub-query within the optimized database query. |

METHODS AND SYSTEMS FOR OPTIMIZING QUERIES IN A MULTI-TENANT STORE

CLAIM OF PRIORITY

This continuation application is related to, and claims priority to, the provisional utility application entitled "METHODS AND SYSTEMS FOR PERFORMING CROSS STORE JOINS IN A MULTI-TENANT STORE," filed on Apr. 19, 2010, having an application No. of 61/325, 709 and attorney docket No. 8956P006Z, the entire contents of which are incorporated herein by reference; this application is related to, and claims priority to, the provisional utility application entitled "METHODS AND SYSTEMS FOR OPTIMIZING QUERIES IN A MULTI-TENANT STORE," filed on Apr. 20, 2010, having an application No. of 61/325,951 and attorney docket No. 8956P007Z, the entire contents of which are incorporated herein by reference; and this application is further related to, and claims priority to the non-provisional utility application entitled "METHODS AND SYSTEMS FOR OPTIMIZING QUERIES IN A MULTI-TENANT STORE," filed on Dec. 20, 2010, having an application No. of 12/973,676 and attorney docket No. 8956P007, the entire contents of which are incorporated herein by reference; and this application is further related to, and claims priority to the non-provisional utility application filed on Apr. 23, 2013, having an application Ser. No. of 13/868,746, and attorney docket No. 8956P007C, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to methods and systems for optimizing queries in a multi-tenant store.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

In conventional database systems, database users access data resources from one logical or relational database. A user of such a conventional system typically retrieves data from and stores data on the system using the user's own systems. A client device may remotely access one of a many of server systems, each of which may then, in turn, access such a conventional database system. Data retrieval from such conventional database systems may include a client or server issuing a query to the conventional database system which may, in response, process the request for information received via the query and return information to the requestor relevant to the request. Improving the speed, security, easy of use for both users and administrators, efficiency of system and network resources, and accuracy of data stored and retrieved have all been, and continue to be the focus and goal of administrators of conventional database systems.

Unfortunately, such conventional database systems exhibit many undesirable characteristics, such as processing queries and requests relatively slowly (e.g., when a large number of users simultaneously make a request of the same conventional database system), allow data access to unauthorized persons, become increasingly inefficient over time, waste network and system resources with overhead that does not contribute directly to the storage and processing of data, etc.

Various types of databases are also available, such as relational database models and non-relational database models, each having their own particular benefits and drawbacks. Unfortunately, database queries that simultaneously reference information from multiple data stores are highly inefficient and detract from benefits that may otherwise be derived from the implementation of multiple data stores of different types. Moreover, database queries that simultaneously reference distinct implementations of diverse database models may be wholly impracticable using previous database query mechanisms as conventional query engines lack the sophistication to communicate with diverse database types.

BRIEF DESCRIPTION OF THE DRAWINGS

Embodiments are illustrated by way of example, and not by way of limitation, and can be more fully understood with reference to the following detailed description when considered in connection with the figures in which:

FIG. 1 illustrates an exemplary architecture in which embodiments may operate;

FIG. 2 illustrates an alternative exemplary architecture in which embodiments may operate;

FIGS. 7A and 7B each set forth a table depicting exemplary database query optimizations in accordance with the embodiments described herein.

DETAILED DESCRIPTION

Figure 3A:
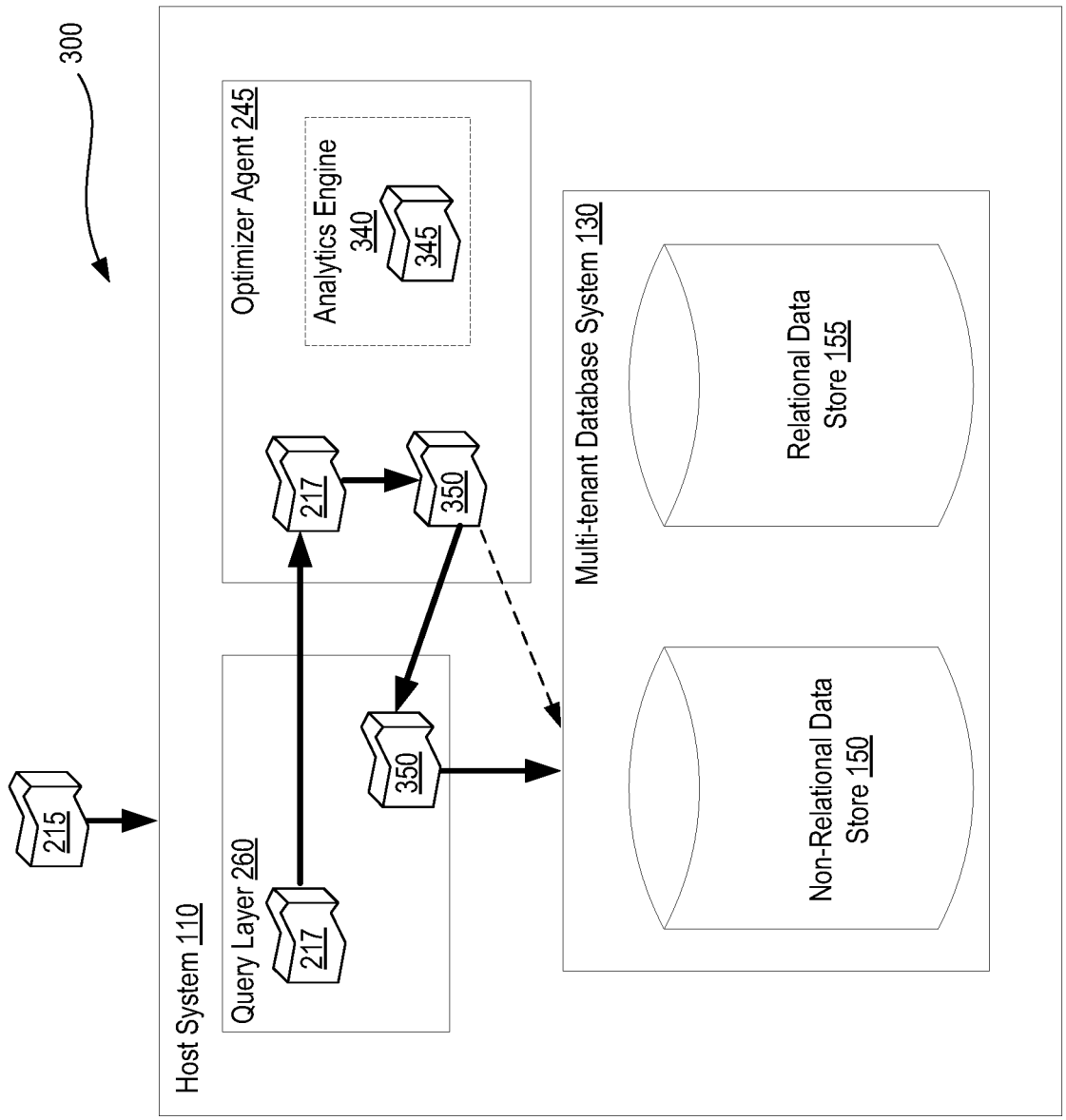
FIG. 3A illustrates an alternative exemplary architecture in which embodiments may operate.

Described herein are systems, devices, and methods for optimizing queries in a multi-tenant store. In one embodiment, such a method includes retrieving data from a multi-tenant database system having a relational data store and a non-relational data store. For example, in such a method, a host system for the multi-tenant database system receives a request specifying data to be retrieved from the multi-tenant database system, retrieving, based on the request via the host system, one or more locations of the data to be retrieved, generating, at the host system, a database query based on the request, in which the database query specifies a plurality of data elements to be retrieved, the plurality of data elements including one or more data elements residing within the non-relational data store and one or more other data elements residing within the relational data store, optimizing the database query via a query optimizer to generate an optimized database query having an optimized query syntax that is distinct from a query syntax of the database query, and executing the optimized database query against the multi-tenant database system to retrieve the data.

Database query logic is made more complex when the requested data set is spread across diverse database structures and when the referenced database system supports multiple tenants or multiple customer organizations, as is the case with a multi-tenant database system. Such a system greatly simplifies efforts on the part of a customer organization, as the a multi-tenant database system may be utilized as though it is a service that is accessible via the cloud, for example, over the Internet, without requiring the customer organization to implement any database hardware or functionality themselves. However, a hosting entity of the multi-tenant database system must cope with greatly increased complexity. As a result of this complexity, there are often opportunities to optimize database queries directed toward such a multi-tenant database system. Such optimizations may be undertaken by the hosting entity, without requiring participation from customer organizations that utilize the multi-tenant database system.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a computer readable storage medium having instructions stored thereon, causes one or more processors within a multi-tenant database environment to perform the methods and operations which are described herein. In another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language. It will be appreciated that a variety of programming languages may be used to implement the teachings of the embodiments as described herein.

FIG. 1 illustrates an exemplary architecture 100 in which embodiments may operate. Architecture 100 depicts a host system 110 communicably interfaced with several customer organizations (105A, 105B, and 105C) via network 125. Within host system 110 is a multi-tenant database system 130 having a plurality of underlying hardware, software, and logic elements 120 therein that implement database functionality and a code execution environment within the host system 110 and in which the hardware, software, and logic elements 120 of the multi-tenant database system 130 are separate and distinct from a plurality of customer organizations (105A, 105B, and 105C) which utilize the services provided by the host system 110 by communicably interfacing to the host system 110 via network 125. In such an embodiment, each of the separate and distinct customer organizations (105A-105C) may be remotely located from the host organization that provides services to the customer organizations (105A-105C) via host system 110 having the multi-tenant database system 130 executing therein. Alternatively, one or more of the customer organizations 105A-105C may be co-located with the host system 110, such as within a same host organization that provides the multi-tenant database system 130 upon which underlying data is persistently stored.

In one embodiment, the hardware, software, and logic elements 120 of the multi-tenant database system 130 include at least a non-relational data store 150 and a relational data store 155, which operate in accordance with the hardware, software, and logic elements 120 that implement the database functionality and code execution environment within the host system 110. Host system 110 may further receive requests 115 from one or more of the plurality of customer organizations 105A-105C via the network. For example, an incoming request 115 may correspond to a request for services or a request to retrieve or store data on behalf of one of the customer organizations 105A-C within the multi-tenant database system 130.

FIG. 2 illustrates an alternative exemplary architecture 200 in which embodiments may operate. In one embodiment, host system 110 implements a method of optimizing queries in a multi-tenant database system 130 having a relational data store 155 and a non-relational data store 150.

In one embodiment, a request 215 is received at host system 110 on behalf of the multi-tenant database system 130. In such an embodiment, request 215 specifies data 218 to be retrieved from the multi-tenant database system 130. In some embodiments, a distinct web-server 210 operating within the host system 110 receives the incoming request 215 via network 125. For example, web-server 210 may be responsible for receiving requests 215 from various customer organizations 105A-C via network 125. Web-server 210 may provide a web-based interface to an end-user client machine originating the request 215 (e.g., such as an end-user client device located within a customer organization 105A-C), the request 215 constituting a request for services from the multi-tenant database system 130 operating within a host organization such as host system 110 that provides, for example, remotely implemented cloud computing services. In some embodiments, request 215 specifies data 218 to be written to, or updated within, multi-tenant database system 130, rather than retrieved.

In one embodiment, host system 110 retrieves, based on the request 215 received, one or more locations 216 of the data 218 to be retrieved. In one embodiment, a customer schema 240 describes the one or more locations 216 of data 218 to be retrieved, in which the customer schema 240 specifies each of the plurality of data elements of the data 218 to be retrieved as residing within either the non-relational data store 150 or residing within the relational data store 155, or as being available from both the non-relational data store 150 and the relational data store 155. In one embodiment, the host system 110 retrieves the customer schema 240 responsive to receiving the request 215. Alternatively, the host system 110 retrieves the one or more locations 216 of the data 218 to be retrieved from the customer schema 240. In one embodiment where the request 215 specifies data to be written or updated within the multi-tenant database system 130, the host system retrieves one or more locations 216 within either the non-relational data store 150 or the relational data store 155 to update data as specified or to write data as specified, for example, the one or more locations 216 being target locations.

Customer schema 240 may be accessible via, for example, a global caching layer that provides fast efficient access to various elements of a host system 110 implementing or providing the described multi-tenant storage capabilities. In alternative embodiments, the one or more locations 216 of data 218 to be retrieved, updated, or written available, provided, or retrieved via the customer schema 240 by the host system 110, by an optimizer agent 245, by a query layer 260 of the host system 110, or by other elements of the host system 110 responsible for determining the locations 216 of data 218 to be retrieved from the multi-tenant database system 130 that is spread across diverse database implementations, such as data 218 having a plurality of data elements residing in the non-relational data store 150 and the relational data store 155 as depicted or alternatively, data that is to be updated within, or written to, the non-relational data store 150 and/or the relational data store 155.

In one embodiment, the host system 110 generates a database query 217 based on the request 215, in which the database query 217 specifies a plurality of data elements to be retrieved, the plurality of data elements including one or more data elements residing within the non-relational data store 150 and one or more other data elements residing within the relational data store 155. In a particular embodiment, the database query 217 is based further on the retrieved one or more locations 216 of the data 218 to be retrieved, updated, or written. Such a database query 217 may further be generated or delegated by the host system 110 for generation by a sub-system of the host system 110, such as query layer 260 or optimizer agent 245.

In some embodiments, database query 217 includes a plurality of sub-queries. In such an embodiment, at least one of the plurality of sub-queries are directed toward retrieving the one or more data elements residing within the non-relational data store 150 from the non-relational data store 150 and at least a second one of the plurality of sub-queries are directed toward retrieving the one or more other data elements residing within the relational data store 155 from the relational data store 155. For example, depicted by FIG. 2 within the expanded view of database query 217 are several sub-query strings such as "retrieve data element 'a' from the non-relational data store" (e.g., 150) and "retrieve data element 'b' from the relational data store" (e.g., 155) and another sub-query string which states "select 'x' from 'y' where 'z'" reflective of a generic Structured Query Language (SQL) type query. Such a query may or may not be appropriate for querying the underlying data stores (e.g., 150 and 155) depending upon the implementing query language or syntax chosen.

FIG. 3A illustrates an alternative exemplary architecture 300 in which embodiments may operate. In particular, optimizer agent 245 is described in additional detail in accordance with certain embodiments.

In one embodiment, host system 110 optimizes the database query 217 to generate an optimized database query 350 having an optimized query syntax that is distinct from a query syntax of the database query 217, such as the syntax specified by an initial, preceding, or un-optimized database query, such as database query 217.

For example, an incoming request (e.g., 215) may specify data to be retrieved, but may additionally specify a query syntax with which to retrieve the requested data 218 or a query syntax with which to update or write specified data. Such a query syntax may be technically or syntactically capable of retrieving, writing, or updating the specified data (e.g., if executed, the query syntax may execute without error and produce the requested data or effectuate the requested update or write operation), however, the query syntax may nevertheless be capable of optimization. Database queries that have the potential to be optimized, may similarly be generated by the host system 110 itself, such as database query 217 which may be generated by query layer 260.

The mere fact that a database query 217 may technically or syntactically execute to produce results without error does not necessarily mean that such a query is as efficient as it potentially can be. For example, optimizations may be available to make the query return a result faster, return a result with consuming fewer computing resources, such as bandwidth, processor cycles, memory, etc., return a result utilizing less cost, such as through the use of lower cost commoditized hardware and systems, and so forth.

Thus, in accordance one embodiment, although a first database query 217 may be specified and available for execution, an optimized database query 350 is generated having optimized query syntax distinct from the original or previously available database query 217. Examples of distinct query syntaxes are provided at FIGS. 7A and 7B and discussed below.

In such an embodiment, the optimized database query 350 is then executed against the multi-tenant database system 130 to retrieve, update, or write specified data 218, rather than executing an un-optimized and/or previously available database query 217. In accordance with one embodiment, executing the optimized database query 350 against the multi-tenant database system 130 includes referencing data elements stored in both the relational data store 155 and the non-relational data store 150 so as to retrieve the requisite data 218. Alternatively, the optimized database query 350 includes referencing one or more target locations to update the specified data 218 or write the specified data 218 to the multi-tenant database system 130.

In one embodiment, query layer 260 receives the optimized database query 350 from optimizer agent 245 and then passes the optimized database query 350 to the multi-tenant database system 130. In alternative embodiments, optimizer agent 245 passes the optimized database query 350 directly to the multi-tenant database system 130 for execution via its underlying hardware, software, and logic elements 120, as depicted via the dashed arrow directing optimized database query 350 from optimizer agent 245 directly to the multi-tenant database system 130.

In one embodiment, database analytics 345 are generated for one or more customer organizations 105 based on data structures and historical database queries corresponding to each of the one or more customer organizations. In one embodiment, an analytics engine 340 of the optimizer agent 245 generates the database analytics 345. In alternative embodiments, analytics engine 340 operates externally to optimizer agent 245 and provides database analytics 345 to the optimizer agent 245.

Database analytics 345 may include specified size thresholds (e.g., number of rows, amount of data in terms of size (e.g., megabytes of data), cardinality of data requested, etc.). Such analytics may be performed in advance, before a request for data is received, or on-the-fly, responsive to receiving a request for data.

Figure 3B:
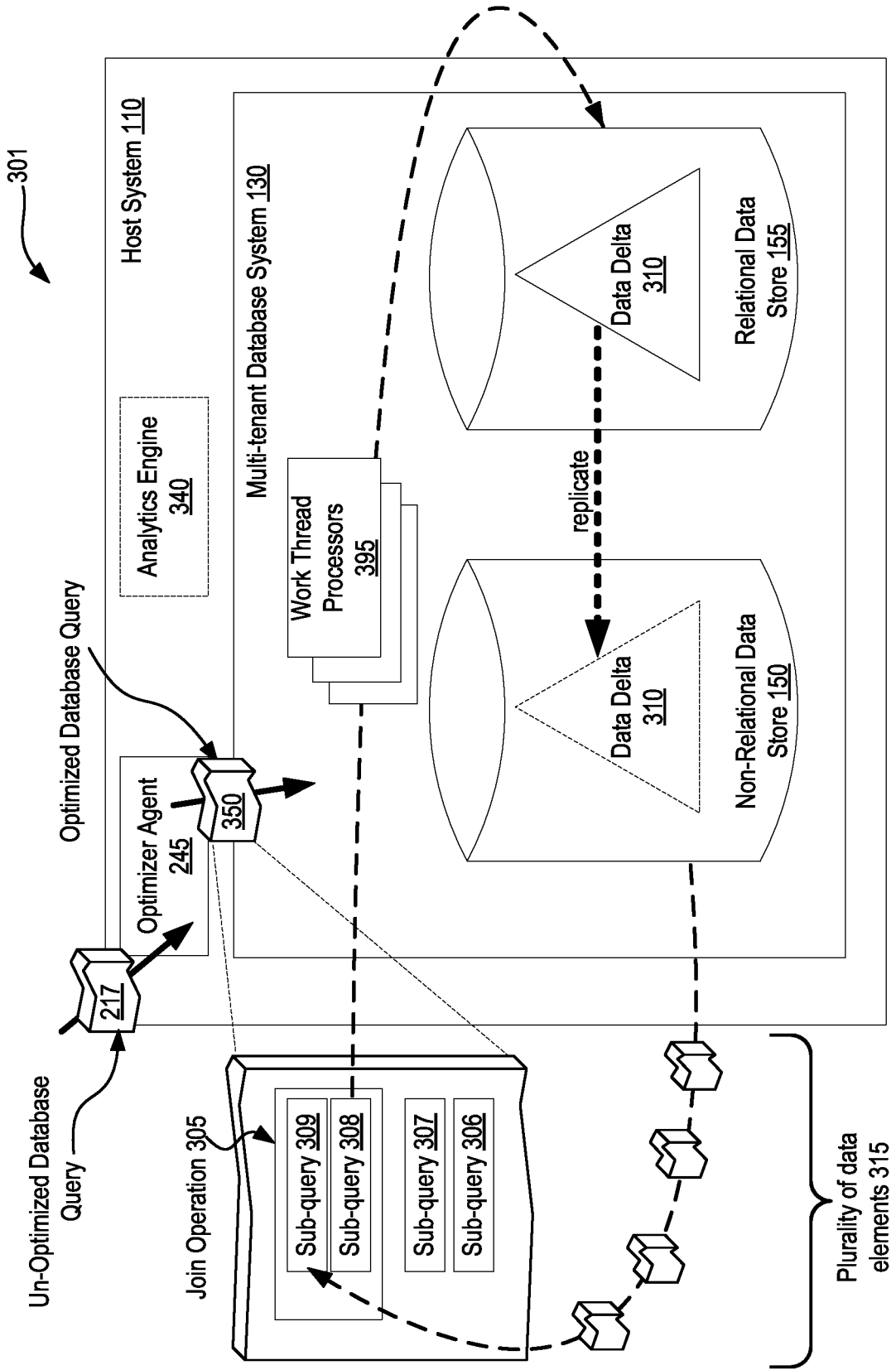
FIG. 3B illustrates an alternative exemplary architecture in which embodiments may operate.

Database analytics 345 may be based upon, for example, known statistics and analysis within the host system 110, such as a query cost for a particular database query 217 or for one or more sub-queries (e.g., 306-309 from FIG. 3B). Such statistics and analysis may be derived from a known pick list quantity for a particular query in which a maximum number of elements is known, and thus, a maximum or estimated query cost is determinable or is known and available from the optimizer agent 245 or analytics engine 340.

In one embodiment, the optimized database query 350 is generated based on database analytics 345 which are generated or created for the respective customer organization 105 having originated a corresponding request 215. For example, database analytics 345 may be available on a per-customer organization basis and may be used for optimizing the original database query 217. Database analytics 345 on a per-customer organization basis may be applicable wherein a particular database table or a particular series of database objects or records are only accessed by one customer. Take for example a listing of sales-leads for a particular customer organization's sales team. Such information may be accessible to only a single customer-organization, and thus, analytics performed against such a table may be specific to that single customer-organization 105.

Similarly, there may be many customer organizations, each of whom have sales-leads data stored within the multi-tenant database system 130, however, each of the sales-lead data sets associated with the various customer organizations may have different characteristics, such as distinct overall sizes, different numbers of records, different fields, and different storage structures, such as being stored within the non-relational data store 150 portion or the relational data store portion 155 of the multi-tenant database system 130. Each of these varying characteristics may affect the manner in which a particular query may be optimized. Because each customer organization may have data sets with characteristics distinguishable from other customer organizations having data stored within the same multi-tenant database system 130, it may be advantageous to conduct at least a portion of the database analytics 345 on a per-customer organization basis.

Although some database analytics 345 which relate to data associated with multiple distinct customer organizations 105 or an entire data store as a whole (e.g., 150 or 155) may also be beneficial in some situations, in other situations, having database analytics 345 that are based on an entire data store as a whole (e.g., 150 or 155) or based on multiple distinct customers organizations 105, each having their own varied structures and characteristics, may potentially cause potential optimizations to be averaged out, or canceled out, and thus, a potential optimization may be missed altogether. Thus, in accordance with certain embodiments, one or more database analytics 345 are based on a per-customer organization 105 basis.

FIG. 3B illustrates an alternative exemplary architecture 301 in which embodiments may operate. For example, in one embodiment, host system 110 passes an optimized database query 350 to the multi-tenant database system 130 for execution in which the optimized database query 350 includes one or more database join operations 305.

In one embodiment, the query optimization consists of a modification to the order of one or more specified join operations within an un-optimized query or a pre-existing query. For example, in one embodiment, an un-optimized database query 217 includes a specified order for two or more database join operations 305. In such an embodiment, optimizing the database query includes modifying the specified order for the two or more database join operations within the optimized database query 350.

In alternative embodiments, there are no join operations specified within the un-optimized database query 217, and thus, optimizing the database query includes modifying the un-optimized database query 217 to include at least one database join operation 305, or in some embodiments, two or more database join operations 305 and a specified order for the two or more database join operations within the optimized database query 350. In alternative embodiments specified or implicit join operations within an un-optimized database query 217 are negated altogether through alternative query syntax resulting in the optimized database query 350 executing without having to perform a previously specified join.

In one embodiment, at least one of the database join operations 305 within the optimized database query 350 includes joining a child table from the non-relational data store 150 with a master table from the relational data store 155.

In some embodiments, a join operation 305 includes multiple sub-queries. For example, in such an embodiment a first sub-query is to be executed against the non-relational data store 150 and identifies the one or more data elements residing within the non-relational data store 150. In such an embodiment, a second sub-query 308 is to be executed against the relational data store 155 which then retrieves data elements 315 from the relational data store 155 that are not available from the non-relational data store 150. Such elements may be joined within a new table in either data store (e.g., 150 or 155) or joined together in a caching location. In alternative embodiments, missing data from one data store is replicated from a source location to a target location. For example, sub-query 308 may determine a data delta 310 between the first sub-query that identifies the one or more data elements residing within the non-relational data store 150 and the one or more other data elements residing within the relational data store 155. In such an embodiment, a third sub-query may be executed against the relational data store 155 and the non-relational data store 150, wherein the third sub-query replicates data corresponding to the determined data delta 310 from the relational data 155 store to the non-relational data store 150, such as that which is depicted by sub-query 308 causing a replication event from relational data store 155 to non-relational data store 150 based on the determined data delta 310.

For example, sub-query 308 may retrieve the one or more other data elements residing within the relational data store 155, pulling them into, for example, a temporary table, file, temporarily caching the data, etc., and then such a third sub-query 308 may issue an insertion or write command of the retrieved data corresponding to the data delta 310 against the non-relational data store 150, causing the data delta 310 data to be written, stored, or inserted into the non-relational data store 150, thus completing the replication and thus further causing the previously unavailable data elements which resided in the relational data store 155 to now be available from the non-relational data store 150. Refer to the dashed line of FIG. 3B depicting sub-query 308 being executed against both data stores (relational data store 155 and non-relational data store 150) to replicate the identified data delta 310 from the relational data store 155 to the non-relational data store 150.

Optimized database queries 350 utilizing replication or data synchronization between data stores (e.g., 150 and 155) may be derived from a policy to replicate a smaller dataset from its primary location to the location having the larger dataset. For example, replicating the one or more data elements that are part of the requested data may be more efficient from a network bandwidth perspective to conduct the replication from the relational data store 155 to the non-relational data store 150, than vise-versa. Analytics engine 340 may provide such a policy based on previously performed database analytics 345 or based on on-the-fly database analytics 345 conducted via, for example, one or more sub-queries 306-309 within an optimized database query 350 or pre-queries executed as part of the development of the optimized database query 350.

Other database optimization decisions may be based upon policies that reflect optimizations to data consistency and resiliency. For example, optimized database query 350 may implement one or more sub-queries 306-309 or database query syntax to ensure consistency guarantees. For example, replicated data and synchronized data is not necessarily guaranteed to be in sync depending on how the multi-tenant database system 130 performs its synchronization algorithms. The optimized database query 350 may reflect an optimization that is more computationally economical or more economical from a bandwidth perspective, but does not require a consistency guarantee when the potential for data deviance is an acceptable risk. Alternatively, the optimized database query 350 may reflect an optimization that requires a consistency guarantee, and thus, such an optimization may not emphasize speed or computational efficiency, but instead, emphasize data guarantees. Such a policy may be triggered by an incoming request 215 from a customer organization 105 or triggered internally based on a policy specified by, for example, analytics engine 340.

Thus, in accordance with one embodiment, optimizing the original database query 217 includes a) identifying a first sub-query within the original database query 217 directed to a table within relational data store 155 in which the first sub-query corresponds to a first portion of data to be retrieved based on an incoming request 215; b) identifying a second sub-query within the original database query 217 directed to a table in the non-relational data store 150 in which the second sub-query corresponds to a second portion of the data to be retrieved based on the request 215; c) replicating the table within the relational data store 155 to the non-relational data store 150; and d) generating the optimized database query 350 with one or more sub-queries 306-309 to fetch both the first portion of the data to be retrieved and the second portion of the data to be retrieved from the non-relational data store 150. Stated differently, the resultant optimized database query 350 references only the non-relational data store 150 for all of its requisite data to be retrieved, made possible through the replication event conducted by, for example, optimizer agent 245. In some embodiments, the replication even is triggered before the original database query 217 is received, for example, where the original database query 217 is conducted frequently enough for the analytics engine 340 or the optimizer agent 245 to determine that it is economically viable to trigger such a replication event.

In some embodiments, the replication is performed in the opposite direction, and all data is retrieved from the relational data store 155 instead of the non-relational data store 150. In some embodiments, an entire table specified via corresponding "FROM" clause is replicated, while in others, only particular columns are replicated or particular records derived from a corresponding "WHERE" clause are replicated. For example, a relevant data set may be replicated between the underlying data stores 150 and 155 so as to negate an otherwise required join operation where data elements from each of the data stores 150 and 155 are being evaluated as part of the original database query 317. In yet other embodiments, a non-SQL based syntax is utilized to specify tables or portions of tables for replication. In some embodiments, one or more data structures or data sets are replicated, for example, data in a non-relational data store 150 for which there is no associating "table" structure. For example, a list or series of data files may be replicated from a non-relational data store 150 and represented within a table of a relational data store 155 as object elements. Such files and objects may instead require searching and parsing various elements as they do not reflect a relational "table" based format, but may nevertheless contain relevant data which can be leveraged to conduct a fulfill a request 215.

In one embodiment, an un-optimized database query 217 includes a plurality of sub-queries each having a corresponding "WHERE" clause and optimizing the database query 217 includes analyzing each of the plurality of sub-queries based on in-memory cached statistics to identify one of the plurality of sub-queries as a most efficient sub-query of the original database query 217. Based on the in-memory cached statistics, the optimized database query 350 is then generated having the one sub-query identified as the most efficient sub-query as a leading query within the optimized database query 350. For example, un-optimized database query 217 may include sub-queries (similar to sub-queries 306-309) in which sub-query 306 is specified as the leading query. In such an embodiment, the optimized database query 350 may similarly include sub-queries 306-309 corresponding to those within the original database query 217, but sub-query 309 may be identified as the most efficient sub-query, and thus, specified as the leading query as part of the query optimization. In one embodiment, the in-memory cached statistics are available via analytics engine 340. In alternative embodiments, the in-memory cached statistics are available via a global caching layer accessible from the optimizer agent 245.

In one embodiment, the most efficient query among a plurality of sub-queries in the un-optimized database query 217 is identified based on the one sub-query among the plurality of sub-queries within the un-optimized database query 217 corresponding to a best metric or a best combination of metrics in accordance with the in-memory cached statistics. In such an embodiment, each metric may be selected from the group comprising: a number of rows, a number of blocks, an average row length; Input/Output (I/O)

utilization; processor utilization; and execution time. For example, a sub-query targeting a table or data structure with a small number of elements may result in subsequent sub-queries being more efficient as there may be fewer elements to evaluate stemming from the decision to lead with a sub-query directed to the smaller table or data structure. Alternatively, it may be determined that a larger table organized relationally is more efficient to lead an optimized query than having to search or parse an smaller index or a file which is not organized relationally. Analytics engine 340 may specify such policy determinations and thresholds based on available statistics and analytics.

In one embodiment, optimizing the database query 217 includes a) identifying a sub-query within the un-optimized database query 217 that references a parent table within the relational data store as a leading sub-query within the un-optimized database query 217; b) injecting a new join operation to a foreign key index into the leading sub-query to the parent table in the relational data store, wherein the join operation joins a custom index on a foreign key for the non-relational data store; and c) leading the optimized database query 350 with the sub-query to the parent table having the join operation injected therein.

In accordance with one embodiment, optimizing the database query includes: a) identifying within an un-optimized database query, a sub-query to a named table within the relational data store having a "WHERE" clause to invoke a full table scan; b) replacing the identified sub-query to invoke the full table scan with an optimized sub-query to invoke a range scan of an index table associated with the named table; c) leading the optimized database query with the optimized sub-query; and d) injecting a join operation to the optimized database query, wherein the join operation combines indexed column data from the index table with results of the optimized sub-query when available and further joins non-indexed column data from the named table when indexed columns cover less than all required columns of the named table based on the identified sub-query.

Full table scans may provide significant opportunities for optimization, especially where an index table already exists for named data table. A full range scan may occur or be invoked by a database query when a table is specified and a "WHERE" clause specifies a particular matching condition. For example, "WHERE" an employee ID equals 12345 or "WHERE" salary is less than $50,000.00. If transacted in an un-optimized form, the query causes the database to consider each and every row within a named table to evaluate whether or not the condition exists. The query has no opportunity to pre-terminate until all rows are evaluated, a potentially wasteful exercise in large tables (e.g., a million row table thus requires a million condition evaluations). Conversely, by replacing the sub-query with an optimized sub-query directed toward an index table, the indexing scheme (e.g., traversing a b-tree, etc.) may be utilized to complete the same evaluation required by the "WHERE" clause, without having to consider all rows, and potentially negating consideration of a vast majority of rows in the named table. Where additionally required column data is present within the index table (e.g., because the columns are frequently referenced and thus indexed), the additionally required column data may be retrieved from the index table. Where column data is not covered by the index table, the originally specified named table may be referenced, now requiring only consideration of a known subset of rows or records due to the preceding optimized sub-query leading the directed to lead the optimized database query.

In one embodiment, an un-optimized database query 217 includes a plurality of sub-queries within the un-optimized database query 217, each having a corresponding "WHERE" clause to retrieve a specified plurality of data elements 315 and optimizing the database query includes a) generating a pre-query for two or more of the plurality of sub-queries, in which each pre-query specifies the retrieval of a portion of the respective plurality of data elements 315 for the corresponding sub-query; b) executing each of the pre-queries against the multi-tenant database system 130; c) ranking the executed pre-queries on the basis of one or more metrics including Input/Output (I/O) utilization for the pre-query, processor utilization for the pre-query, and execution time for the pre-query; and d) generating the optimized database query 350 based on the ranking of the executed pre-queries.

For example, some un-optimized database queries 217 will solicit data retrieval or initiate database actions for which sufficient statistics or database analytics 345 are not available via the analytics engine 340 or elsewhere. When a requested un-optimized database query 217 is sufficiently large in terms of computational resources, execution time, bandwidth resources, or some other metric, it may be more efficient to have the optimizer agent 245 initiate probing pre-queries and test-queries against the multi-tenant database system soliciting a sub-set of the required information in order to determine which of various available retrieval or execution schemes are most efficient. Although the pre-queries themselves consume time and resource, the resources consumed may provide a return (e.g., an efficiency improvement or optimization) that is greater than the resources required to generate, execute, and evaluate the results of such pre-queries. For example, if a requested database query 217 requires searching millions of rows, it may very well be advantageous to trigger probing queries on a small subset of the total rows and evaluate which of multiple options most efficiently executes.

In some embodiments, a determination whether to conduct pre-queries may be made by the optimizer agent based on statistics or database analytics 345. For example, where an un-optimized database query 217 is evaluated to require resources below a particular threshold, pre-queries may be by-passed and other optimizations implemented not requiring the pre-queries. Such an evaluation may be based on, for example, a known cardinality or table depth of a specified target table or specified columns in a "WHERE" clause of the un-optimized database query 217. Other considerations may be based upon a size classification for a particular client organization, a corresponding size on disk of a specified table or data structure, etc. In some embodiments, pre-query results are stored/cached and referenced in subsequent database requests 215 for which a common pre-query result may be referenced without re-execution. In one embodiment, a known pick list quantity (e.g., a known a maximum number of elements) for a referenced column or table or relevant sub-query is known, and thus, a maximum or estimated query cost is known and available from the analytics engine 340 or may be determinable via the optimizer agent 245 (e.g., through one or more pre-queries).

In one embodiment, a pre-query operates as a filter. For example, optimizer agent 245 may generate an execute query logic to retrieve additional detail from the database query to be optimized in search of or to "filter" which of multiple optimized query statements may be most appropriate or most efficient for the underlying database store. A similar database query may be optimized one way for the non-relational data store 150 and yet another way for the relational data store 155. For example, in one embodiment, a getSelectiveFilter( ) function or SqlOptimizer.getSelectiveFilter( ) logic module systematically processes multiple SQL based "WHERE" clauses looking for which one of the multiple available is the best, most appropriate, or most efficient one to lead an optimized database query 350. In such an embodiment, the identified "WHERE" clause is selected and used to lead an optimized database query 350 having multiple sub-queries. Such an optimization may output extra leading joins and additional directives supported by the underlying data store (150 or 155), within the optimized database inquiry, for example, instructing the underlying data store (150 or 155) on how to process, respond to, implement, or execute the optimized database query 350.

In one embodiment, a filtering mechanism e.g., getSelectiveFilter( ), may be based on available types of IndexedFilter implementations supported by an underlying data store (150 or 155). For example, basic custom indexes and name-indexes may be referenced (e.g., search name lookup), or more sophisticated query scopes (e.g., My Records) or index joins may be specified via an optimized database query 350. Such indexes and query scopes can be implemented on relational database query engines as well as non-relational database query engines. In addition to specialized filters and indexes, pivot tables may further be utilized as potential query optimizations when supported by the target data store. Whether or not such capabilities are supported by a particular data store (150 or 155) may be tracked and managed by implementing logic of an optimizer agent 245, or alternatively, may be discoverable via an analytics engine 340 on behalf of the optimizer agent.

In one embodiment, a database store dependent key function, mechanism, or method employed by a filter mechanism (e.g., IndexedFilter) implements a getSlowStats( ) or equivalent function to perform a database store-dependent pre-query to estimate the selectivity of queries. Alternatively, a getFastStats( ) or equivalent function may be used in a database store-independent fashion when the cardinality of a query can be determined from in-memory cached statistics. For example, where a picklist histogram is known and available (e.g., via analytics engine 340) without having to execute pre-queries. Same or equivalently corresponding data structures (e.g. where a custom_index_ndv=num distinct values) can be used to store statistics regardless of whether the underlying database store is relational or non-relational.

In some embodiments, various implicit indexes may be presumed to always be present, regardless of whether implementation and/or optimization query logic is data store dependent (e.g., specific to either non-relational data store 150 or relational data store 155). For example, a Name field of a custom object may be presumed to always be indexed (e.g., such as when targeting a relational OracleTM based data store). A SearchNameLookup function or equivalent may be used along with its corresponding implementation in a relational data store 155, whereas in non-relational data store 150, a custom index on the Name field may be used to implement equivalent functionality and allow for the above presumption of always being present.

In some embodiments utilizing foreign keys, an optimizer agent 245 may presume a multi-tenant CFKV (custom_foreign_key_value) table to be indexed when targeting a relational data store 155, whereas when optimizing query logic targeting a non-relational data store 150, an implicit custom index may be presumed.

In some embodiments, a policy may specify that optimizing query logic uses a selective filter mechanism, e.g., getSelectiveFilter( ) by default to lead the optimized database query 350 in all cases, via query syntax appropriate for the underlying data store (150 or 155). Where optimizer agent 245 determines to lead the query with a parent table in a join, a join to the foreign key index table may then be injected to support the query lead (e.g., CFKV for relational stores or equivalent custom index on a foreign key for non-relational data store implementations).

In some embodiments, a non-relational data store 150 is made to support corresponding or equivalent query operations as a relational data store 155 via an API (Application Programming Interface) to the respective underlying data stores. For example, such an API may be implemented in the query layer 260 or via the hardware, software, and logic elements 120 of the multi-tenant database system 130. Using such an API, non-relational database objects can be made to support the same query mechanisms as other objects on an otherwise distinct database structure. In some embodiments, the API that implements corresponding or equivalent query operations for distinct data store architectures (e.g., 150 and 155) is made available to the customer organizations 105, for example, via a public dynamic class of Salesforce.com based objects (e.g., "SObjects" or via com.salesforce.objects, for example, inheritable from mx.utils.ObjectProxy). In a particular embodiment, an API query( ) verb and a Salesforce.com Object Query Language (SOQL) compatible syntax is made available as an entry point to a query targeting non-relational data or data stored in a non-relational data store 150, notwithstanding a lack of native non-relational data store 150 support for such a query syntax (the non-compatible syntax is thus transformed via the API or query layer 260).

In a particular embodiment, an API query retrieve verb is directly mapped to a non-relational data store's 150 retrieve( )function internal call, thus permitting less parsing and execution sophistication. In other embodiments, the API query retrieve verb may be parsed and executed or translated into a format supported by the underlying data store, regardless of type.

In certain embodiments, an underlying data store cannot be made to implement equivalent or corresponding functionality which is supported by a different type of data store. In such cases, the API may map to functionality at an application layer, external to the underlying data store (150 or 155) itself, in which the Application layer function retrieves data from the underlying data store utilizing supported query logic, and then manipulates the data at the application layer to reflect the functionality which is not implementable within the underlying data store (150 or 155) itself. The resulting data may then be placed into a caching layer or written to a temporary location within the data store so that an optimized database query 350 can retrieve the manipulated data, for example, as part of a sub-query that may otherwise require the functionality which is not implementable within the data store itself. In such a way, the API appears to a referencing entity as though the requested functionality is supported, regardless of whether the non-relational data store 150 or the relational data store 155 is targeted.

In accordance with some embodiments, optimizer agent 245 may seek to implement data guarantees where data inconsistency may potentially exist. For example, in one embodiment optimizing the database query includes a) identifying a first sub-query to the non-relational data store 150; b) identifying a second sub-query to the relational data store 155 in which the second sub-query is a data delta query to an append log of the relational data store 155 for new or updated data elements within the scope of the first sub-query to the non-relational data store 150 which are not yet flushed from the append log of the relational data store 155 to the non-relational data store 150 (e.g., determines a data delta 310 between a guaranteed up to date append log and a potentially out of date non-relational data store 150); c) executing or triggering a flush against the relational data store 155 to flush the new or updated data elements within the append log of the relational data store 155 to the non-relational data store 150; and d) eliminating the second sub-query to the relational data store 155 from the optimized database query 350. Stated differently, where data consistency guarantees are deemed important enough by the optimizer agent 245 for a particular data request 215, the database query 217 may be optimized to ensure that the non-relational data store 150 which may ordinarily exhibit some level of acceptable data inconsistency is made to be up to date immediately prior to executing the final optimized database query 350 against the non-relational data store 150. Such situations may arise where information that is permanently stored in a non-relational data store is transacted initially and temporarily to a relational data store 155. In alternative embodiments, only the missing elements reflected by the data delta 310 are synchronized or are joined in a temporary cache location.

In accordance with one embodiment, executing the optimized database query 350 against the multi-tenant database system 130 to retrieve the data requested includes a) designating the data to be retrieved as a massive data set based on a comparison of an estimated or actual size of the data to be retrieved against a massive query threshold; b) breaking up the optimized database query 350 into a plurality of optimized sub-queries (e.g., 306-309), each optimized sub-query corresponding to a portion of the massive data set; c) allocating execution of the plurality of optimized sub-queries to one work thread processor within a pool of work thread processors 395, in which the one work thread processor to establish a spooling algorithm internal to the one work thread processor to spool/cache one or more portions of the massive data set returned to the one work thread processor responsive to execution of one or more of the plurality of optimized sub-queries, and further in which the spooling algorithm retrieves a re-requested portion of the massive data set from the spool/cache, when available, in place of re-executing a corresponding optimized sub-query to retrieve the re-requested portion from the underlying data store (e.g., 150 or 155). Such a technique may be referred to as "chunking."

In such a way, a request soliciting a massive data set can be serviced in parts, without triggering multiple distinct work thread processors 395 to execute in parallel in an effort to complete execution of the un-optimized database query 217. Such an approach may be especially beneficial where a massive data set is triggered or requested by mistake (e.g., the query is broader than it need be) or where a retrieving a massive data set in parallel (e.g., as quickly as possible) could detrimentally impair performance of the multi-tenant database system 130 for other customer organizations 105 utilizing the system.

For example, a customer organization 105 may initiate a request 215 for data not realizing the size of the resultant data set may be massive. Although total execution time may be increased for the requesting party (e.g., one of the customer organizations 105), the total load on the multi-tenant database system 130 which is shared by multiple customer organizations 105 may be lessened, and thus, overall system efficiency may be improved. Moreover, if a party is reviewing portions of the data due to the large size of the resultant data set, those sub-portions may be transmitted more efficiently having been broken up into parts or chunks, and re-requests for sub-portions triggered by, for example, paging backwards and forward through a data set, are made more efficient by being serviced via the spooling algorithm implemented by the one work thread processor responsible for executing the optimized sub-queries. In such an embodiment, optimizing the database query 217 results in the optimized database query 350 being arranged for serialized execution rather than parallelized execution.

In one embodiment, executing the optimized database query 350 against the multi-tenant database system 130 to retrieve the data includes a) sending the optimized database query 350 to a query layer agent that operates on behalf of the multi-tenant database system 130 or operates within the multi-tenant database system (e.g., such as query layer 260). In such an embodiment, the query layer agent executes a plurality of sub-queries constituting the optimized database query 350 against the relational data store 155 and the non-relational data store 150 based in part on the customer schema (e.g., 240) and based further on an optimized query syntax defined by the plurality of optimized database sub-queries 350.

In one embodiment, a query layer agent (e.g., 260) executes the plurality of optimized sub-queries making up an optimized database query 350 by designating or allocating each of the plurality of optimized sub-queries to one distinct work thread processor within a pool of work thread processors 395, in which each work thread processor 395 in the pool executes zero, one, or a plurality of the plurality of sub-queries constituting the optimized database query 350. In such a way, an optimized database query 350 may be parallelized resulting in a more time-efficient execution.

Different types of data may be stored by multi-tenant database system 130. For example, in one embodiment, the one or more data elements residing within the non-relational data store 150 correspond to plurality of compressed flat files or a plurality of binary files or a combination of compressed flat files and binary files. Such files may be more efficiently stored via a non-relational database store (e.g., 150).

In another embodiment, relational data store 155 implements a relational database in accordance with a relational database management system (RDBMS), in which a plurality of relation tables of the relational database are inter-related to each other through one or more overlapping common characteristics for each of two or more relation tables within the relational database, thus forming the "relationships" which are commonly associated with relational type data stores 155.

In one embodiment, the non-relational data store 150 implements a distributed structured database having a plurality of underlying hardware storage devices, each providing at least a portion of a total storage capacity for the non-relational data store 150. In such an embodiment, data elements within the non-relational data store 150 are referenceable on the basis of a primary key, but are not referenceable on the basis of one or more overlapping common characteristics between two or more relation tables, such as is the case with data elements within the relational data store 155.

In one embodiment, the relational data store 155 implements a relational database model selected from among the following: an Oracle compatible database implementation, an IBM DB2 Enterprise Server compatible relational database implementation, a MySQL compatible relational database implementation, and a Microsoft SQL Server compatible relational database implementation.

In one embodiment, the non-relational data store 150 implements a NoSQL non-relational database implementation selected from among the following: a Vampire compatible non-relational database implementation, an Apache Cassandra compatible non-relational database implementation, a BigTable compatible non-relational database implementation, and an HBase compatible non-relational database implementation.

In one embodiment, the non-relational data store 150 includes a plurality of distributed computing nodes, each computing node comprising at least a memory, one or more processors, and one or more communicatively interfaced hard disk drives. In such an embodiment, each of the distributed computing nodes may further include an isolated non-relational database instance having functionality to read, write, and update non-relational database transactions without authorization or control from a centralized transaction authority.

In a particular embodiment, the relational data store 155 implements a monolithic relational database instance comprising memory and processors that coordinate computing resources with a centralized transaction authority that controls whether updates or changes to the monolithic relational database instance are committed to persistent storage upon persistent storage devices communicatively interfaced to, and controlled by, the monolithic relational database instance.

Figure 4:
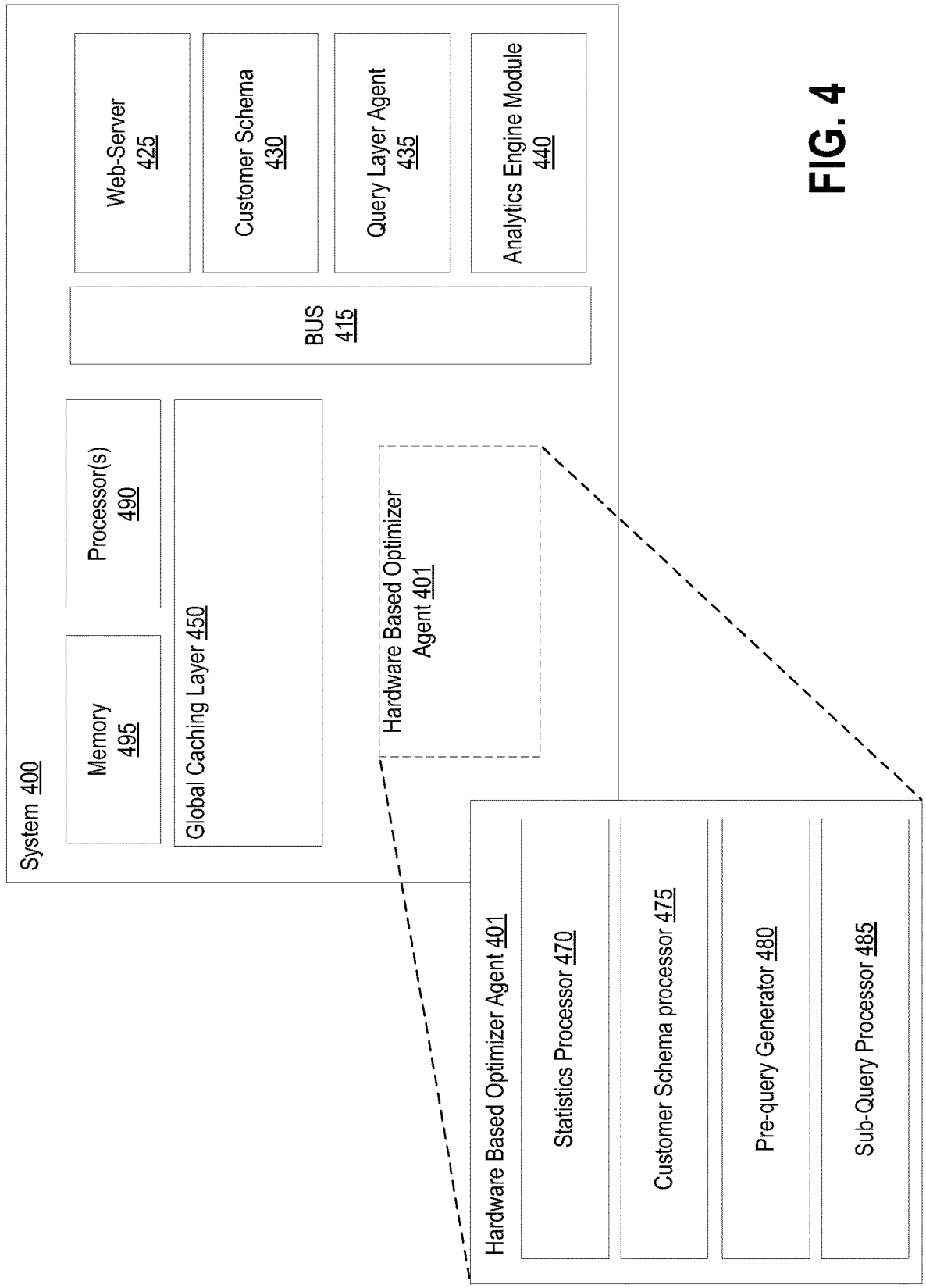
FIG. 4 shows a diagrammatic representation of a system in which embodiments may operate, be installed, integrated, or configured.

FIG. 4 shows a diagrammatic representation of a system 400 in which embodiments may operate, be installed, integrated, or configured.

In one embodiment, system 400 includes a memory 495 and a processor or processors 490. For example, memory 495 may store instructions to be executed and processor(s) 490 may execute such instructions. System 400 includes bus 415 to transfer transactions and data within system 400 among a plurality of peripheral devices communicably interfaced with bus 415. System 400 further includes web-server 425, for example, to receive requests, return responses, and otherwise interface with remote clients, such as client devices located within customer organizations 105A-C.

System 400 is further depicted as having a query layer agent 435 designed to transmit, transact, execute, designate, and/or allocate optimized data queries and optimized database sub-queries against multi-tenant database system (such as that depicted at element 130 of FIG. 1). In some embodiments, query layer agent 435 passes the optimized database queries to the multi-tenant database system 130 for execution without specifying how to process optimized sub-queries. In other embodiments, the query layer agent 435 manages how optimized sub-queries are parallelized and/or serialized for execution.

System 400 further includes a global caching layer 450 to provide caching services to communicably interfaced devices and systems and in particular, provide caching of customer schema data (e.g., meta data, etc.), database analytics, database statistics, stored pre-query results, etc, such as that which is provided by customer schema 430 and/or analytics engine module 440, each of which operate in conjunction with the global caching layer 450. For example, customer schema 430 specifies whether requisite data elements are stored by a relational database or a non-relational database implementation within the multi-tenant database system or both, and may further specify locations within the underlying data stores for one or more data elements that make up a dataset for a corresponding request. Analytics engine module 440 specifies and stores various statistics and database analytics. Information associated with customer schema 430 and analytics engine module 440 may be stored upon a hard drive, a persistent data store or other storage location within system 400.

Distinct within system 400 is hardware based Optimizer Agent 401 which includes statistics processor 470, customer schema processor 475, pre-query generator 480, and sub-query processor 485. In accordance with one embodiment, statistics processor 470 retrieves database statistics, analytics, and stored pre-query/probing query results from the global caching layer 450 or from analytics engine module 440. Customer schema processor 475 may retrieve the one or more locations of the requested data that is to be retrieved from the underlying data stores based on the request, or may retrieve equivalent information from the global caching layer 450. Pre-query generator 480 develops and generates the necessary probing queries or pre-queries when necessary to either retrieve sub-sets or portions of the requested data from the appropriate underlying data stores when such pre-queries are evaluated to be beneficial. Some pre-queries may trigger or initiate join operations causing data subsets to be synchronized, flushed, or replicated from one data store to another, so that subsequent sub-queries can retrieve an entire requested data set from a lone data store. Such pre-queries may rely upon statistics and pre-query results available from the analytics engine module 440. Sub-query processor 485 may perform optimization upon individual sub-queries to generate an overall optimized database query. Such optimizations may include the introduction of a foreign key injection, inserting a join operation, re-ordering/re-sequencing underlying sub-queries, and so forth, so as to optimize the resulting database query that is to be executed.

Figure 5:
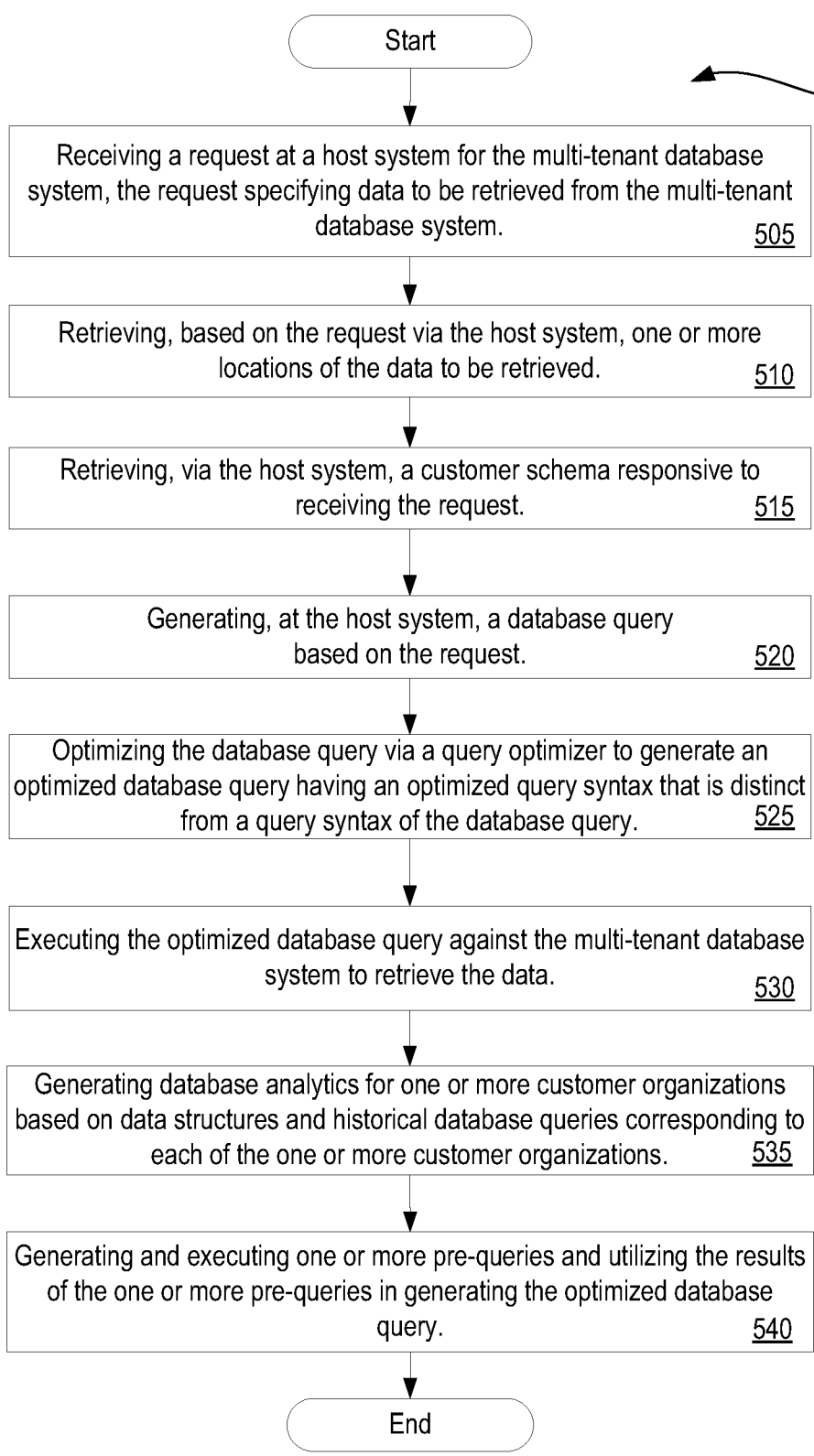
FIG. 5 is a flow diagram illustrating a method for optimizing queries in a multi-tenant store in accordance with one embodiment.

FIG. 5 is a flow diagram illustrating a method 500 for optimizing queries in a multi-tenant store in accordance with one embodiment, including optimizing database queries or a plurality of sub-queries constituting a database query. Such optimizations may include, for example, improving total execution time, reducing computational workload, reducing bandwidth usage, implementing data consistency guarantees, and so forth. Method 500 may be performed by processing logic that may include hardware (e.g., circuitry, dedicated logic, programmable logic, microcode, etc.), software (e.g., instructions run on a processing device to perform various query operations such reading, writing, updating, optimizing, initiating pre-queries, developing sub-queries, etc., or a combination thereof. In one embodiment, method 500 is performed by hardware logic, such as the hardware based optimizer agent depicted at element 401 of FIG. 4. Some of the blocks and/or operations listed below are optional in accordance with certain embodiments. The numbering of the blocks presented is for the sake of clarity and is not intended to prescribe an order of operations in which the various blocks must occur.

Method 500 begins with processing logic receiving a request at a host system for the multi-tenant database system, the request specifying data to be retrieved from the multi-tenant database system (block 505). At block 510, processing logic retrieves, based on the request via the host system, one or more locations of the data to be retrieved.

At block 515, processing logic retrieves, via the host system, a customer schema responsive to receiving the request. For example, a customer schema may describe the one or more locations of data to be retrieved, the customer schema specifying each of the plurality of data elements of the data as residing within either the non-relational data store or residing within the relational data store, or as being available from both the non-relational data store and the relational data store.

At block 520, processing logic generates, at the host system, a database query based on the request. For example, the database query may specify a plurality of data elements to be retrieved, the plurality of data elements including one or more data elements residing within the non-relational data store and one or more other data elements residing within the relational data store. The database query may further include a plurality of sub-queries. In one embodiment, the database query specifies a join operation via one of the sub-queries. In some embodiments, a database query is specified by, or provided within, an incoming customer request.

At block 525, processing logic optimizes the database query via a query optimizer to generate an optimized database query having an optimized query syntax that is distinct from a query syntax of the database query. Such query optimizations improve one or more execution characteristics above and beyond that which is provided for via the originally specified database query or an un-optimized database query, such as execution time, consistency guarantees, serializing or parallelizing execution based on specified policy, etc.

At block 530, processing logic executes the optimized database query against the multi-tenant database system to retrieve the data. In accordance with some embodiments, the original database query specified or requested for execution is discarded and is not passed to the multi-tenant database system for execution, thus leaving only the optimized database query to be executed.

At block 535, processing logic generates database analytics for one or more customer organizations based on data structures and historical database queries corresponding to each of the one or more customer organizations. For example, statistics and database analytics may be generated on a per customer organization basis. In some embodiments, such statistics and analytics are executed prior to receiving a database query which requires them. Alternatively, statistics and analytics may be generated on-the-fly, responsive to receiving a database query to be optimized, and then used in the database query optimization process. Cross customer organization statistics and analysis may similarly be generated and utilized by a query optimizer.

At block 540, processing logic generates and executes one or more pre-queries and utilizes the results of the one or more pre-queries in generating the optimized database query. For example, an optimizing agent may rank the executed pre-queries on the basis of one or more metrics including Input/Output (I/O) utilization for the pre-query, processor utilization for the pre-query, and/or execution time for the pre-query and generate the optimized database query based on the ranking of the executed pre-queries. Various policies may control the rankings. For example, one policy may emphasize reduced I/O utilization, while another may emphasize reduced processor loads, while yet another emphasizes fasted execution times, for example, by implementing sub-queries that may be executed in parallel.

Figure 6:
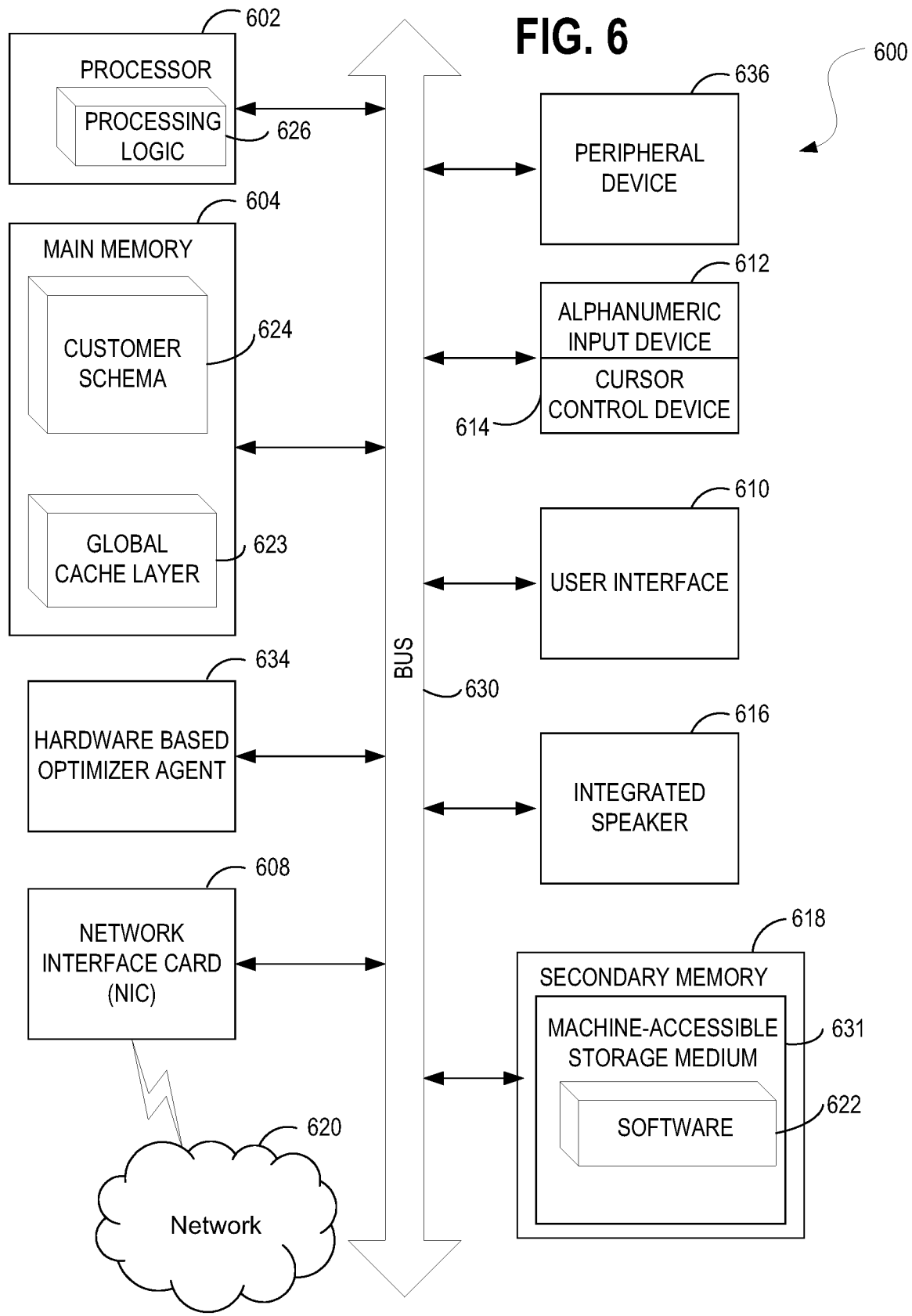
FIG. 6 illustrates a diagrammatic representation of a machine in the exemplary form of a computer system, in accordance with one embodiment.

FIG. 6 illustrates a diagrammatic representation of a machine 600 in the exemplary form of a computer system, in accordance with one embodiment, within which a set of instructions, for causing the machine 600 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services (e.g., a "cloud computing" environment in which a remotely located multi-tenant database system is accessed via, for example, the Internet). Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 618 (e.g., a persistent storage device including hard disk drives and persistent multi-tenant database implementations), which communicate with each other via a bus 630. Main memory 604 includes customer schema 624 (e.g., specifies one or more locations of data or data elements constituting a specified data or data set among two or more diverse data stores, such as locations of data elements spread across both a relational data store and a non-relational data store and retrievable via a query layer agent or via a hardware based optimizer agent 634). Hardware based optimizer agent 634 may implement database query optimizations based on statistics and analytics stored within global caching layer 623 or available via an analytics engine. In one embodiment, global cache layer 623 resides within memory 604 and implements a system-wide accessible global caching layer to provide meta-data and other association or correspondence information between multiple data elements of a larger data set, such as the type of information provided via customer schema 624 in addition to analytics and statistics. Main memory 604 and its sub-elements (e.g. 623 and 624) are operable in conjunction with processing logic 626 and processor 602 to perform the methodologies discussed herein.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and functionality which is discussed herein.

The computer system 600 may further include a network interface card 608. The computer system 600 also may include a user interface 610 (such as a video display unit, a liquid crystal display (LCD), or a cathode ray tube (CRT)), an alphanumeric input device 612 (e.g., a keyboard), a cursor control device 614 (e.g., a mouse), and a signal generation device 616 (e.g., an integrated speaker). The computer system 600 may further include peripheral device 636 (e.g., wireless or wired communication devices, memory devices, storage devices, audio processing devices, video processing devices, etc.

The secondary memory 618 may include a non-transitory machine-readable storage medium (or more specifically a non-transitory machine-accessible storage medium) 631 on which is stored one or more sets of instructions (e.g., software 622) embodying any one or more of the methodologies or functions described herein. The software 622 may also reside, completely or at least partially, within the main memory 604 and/or within the processor 602 during execution thereof by the computer system 600, the main memory 604 and the processor 602 also constituting machine-readable storage media. The software 622 may further be transmitted or received over a network 620 via the network interface card 608.

FIGS. 7A and 7B each set forth a table (700 and 701 respectively) depicting exemplary database query optimizations in accordance with the embodiments described herein.

The first column of each table labeled "query" sets forth an "original query" (second column), a corresponding "optimized query" (third column), and "optimization notes" for the queries as depicted by query example rows 705, 710, 715, 720, 725, 730, and 735 respectively.

Each query row 705-735 provides an example of a potential database query optimization in accordance with the described embodiments. For example, the various query example rows depict filtering optimizations (e.g., 705), an upper bound optimization (710), range scan termination optimizations (715 and 720), negation of a join operation optimization (725), empty byte value optimization in place of an "IS NULL" function (730), and an example of a sub-query optimization implementing evaluation logic within a generated optimized database query (e.g., 350) thus negating an otherwise required join operation (735).

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method of optimizing database queries in a database system having a relational data store and a non-relational data store, the method comprising:
   receiving a request at a host system for the database system, the request specifying data for retrieval from the database system;
   retrieving, based on the request via the host system, one or more locations of the data for retrieval;
   generating, at the host system, a database query based on the request, wherein the database query specifies a plurality of data elements for retrieval, the plurality of data elements including a first portion of the data residing within the non-relational data store and a second portion of the data residing within the relational data store;
   optimizing the database query to include a join operation specifying a plurality of sub-queries to join the first portion of the data and the second portion of the data into a joined data set responsive to the request;
   wherein optimizing the database query further includes: (i) identifying a first sub-query to a table within the relational data store corresponding to the first portion of the data for retrieval, (ii) identifying a second sub-query to the non-relational data store corresponding to the second portion of the data for retrieval, (iii) replicating the table within the relational data store to the non-relational data store, and (iv) generating the optimized database query with one or more sub-queries to fetch both the first portion of the data for retrieval and the second portion of the data for retrieval from the non-relational data store;
   wherein optimizing the database query by (iii) replicating the table within the relational data store to the non-relational data store further comprises optimizing the database query based on a policy to replicate a smaller dataset from its primary location to a location having the larger dataset in fulfillment of the replication; and
   executing the optimized database query against the database system to retrieve the data.

2. The method of claim 1, wherein the database system further comprises elements of hardware and software that are shared by a plurality of separate and distinct customer organizations, each of the separate and distinct customer organizations being remotely located from a host organization having the database system executing therein.

3. The method of claim 1:
   wherein the database query comprises a plurality of sub-queries;
   wherein at least one of the plurality of sub-queries are directed toward retrieving the one or more data elements residing within the non-relational data store from the non-relational data store; and
   wherein at least a second one of the plurality of sub-queries are directed toward retrieving the one or more other data elements residing within the relational data store from the relational data store.

4. The method of claim 1: wherein the policy is provided by an analytics engine executing via a processor and a memory of the database system, wherein the analytics engine provides the policy based on one of (i) previously performed database analytics or based on (ii) on-the-fly database analytics conducted via one or more sub-queries or pre-queries to perform the on-the-fly database analytics on behalf of the analytics engine.

5. The method of claim 1, wherein the join operation comprises a plurality of sub-queries which are generated based on query optimizations available via an optimizer agent of the host system, the query optimizations selected from the group comprising:
   specified ordering for the plurality of sub-queries;
   a target data store for execution of a corresponding sub-query;
   one or more pre-query assessments based on the data for retrieval;

a replication order from the relational data store to the non-relational data store;

an in-memory join operation specifying at least one or more of the plurality of data elements for retrieval from each of the relational data store and the non-relational data store and placed into memory accessible to the optimizer agent and a corresponding sub-query to retrieve the at least one or more of the plurality of data elements from the memory accessible to the optimizer agent in fulfillment of the request.

6. The method of claim 1, wherein the join operation comprises:
a first sub-query for execution against the non-relational data store, wherein the first sub-query identifies the one or more data elements residing within the non-relational data store;
a second sub-query for execution against the relational data store, wherein the second sub-query determines a data delta between the first sub-query identifies the one or more data elements residing within the non-relational data store and the one or more other data elements residing within the relational data store;
a third sub-query for execution against the relational data store and the non-relational data store, wherein the third sub-query replicates data corresponding to the determined data delta from the relational data store to the non-relational data store; and
a fourth sub-query for execution against the non-relational data store, wherein the fourth sub-query fetches the data for retrieval from the non-relational data store by fetching both the one or more data elements residing within the non-relational data store and the one or more other data elements replicated from the relational data store to the non-relational data store and thus available from within the non-relational data store.

7. The method of claim 1, wherein the join operation is selected from the group comprising:
a join operation specifying two or more relation tables from the relational data store;
a join operation specifying at least one relation table from the relational data store and at least one or more data structures residing within the non-relational data store.
a join operation specifying two or more separate and distinct data structures residing within the non-relational data store, wherein each of the two or more separate and distinct data structures lack an overlapping shared key.

8. The method of claim 1, wherein the join operation comprises:
a first sub-query for execution against the non-relational data store, wherein the first sub-query to retrieve the one or more data elements residing within the non-relational data store;
a second sub-query for execution against the relational data store, wherein the second sub-query determines a data delta between the one or more data elements residing within the non-relational data store and the one or more other data elements residing within the relational data store; and
a third sub-query for execution against the relational data store, wherein the third sub- query to retrieve the one or more other data elements residing within the relational data store based on the determined data delta.

9. The method of claim 1:
wherein the database query comprises a plurality of sub-queries; and wherein optimizing the database query further comprises:
retrieving the data utilizing an in-memory join operation into a query layer or an in memory join operation into a global caching layer, the in memory join operation being selected based on known statistics available from an optimizer agent.

10. The method of claim 1, wherein optimizing the database query further comprises:
identifying a first sub-query to the non-relational data store;
identifying a second sub-query to the relational data store, wherein the second sub-query comprises a data delta query to an append log of the relational data store for new or updated data elements within the scope of the first sub-query to the non-relational data store which are not yet flushed from the append log of the relational data store to the non-relational data store; and
executing a flush against the relational data store to flush the new or updated data elements within the append log of the relational data store to the non-relational data store.

11. The method of claim 1, wherein the relational data store comprises a relational database implemented in accordance with a relational database management system (RDBMS), wherein a plurality of relation tables of the relational database are inter-related to each other through one or more overlapping common characteristics for each of two or more relation tables within the relational database.

12. The method of claim 1, wherein the non-relational data store comprises a distributed structured database having a plurality of underlying hardware storage devices, each providing at least a portion of a total storage capacity for the non-relational data store, and wherein data elements within the non-relational data store are referenceable on the basis of a primary key and not on the basis of one or more overlapping common characteristics between two or more relation tables.

13. The method of claim 1:
wherein the non-relational data store comprises a plurality of distributed computing nodes, each computing node comprising at least a memory, one or more processors, and one or more communicatively interfaced hard disk drives, and wherein each of the distributed computing nodes comprise an isolated non-relational database instance having functionality to read, write, and update non-relational database transactions without authorization or control from a centralized transaction authority; and
wherein the relational data store comprises a monolithic relational database instance comprising memory and processors that coordinate computing resources with a centralized transaction authority that controls whether updates or changes to the monolithic relational database instance are committed to persistent storage upon persistent storage devices communicatively interfaced to, and controlled by, the monolithic relational database instance.

14. The method of claim 1:
wherein an optimizer agent executing via a processor and a memory of the database system implements database query optimizations based on statistics and analytics stored within a global caching layer; and
wherein the global caching layer resides within the memory of the database system.

15. A system to optimize database queries for a database system, wherein the system comprises:
a processor and a memory;
a communications interface to the database system, wherein the database system includes both a relational data store and a non-relational data store implemented therein;
a request processor to receive a request at the host system for a database
system, the request specifying data for retrieval from the database system; a customer schema processor to retrieve, based on the request, one or more locations of the data for retrieval;
a query layer agent to generate a database query based on the request, wherein the database query specifies a plurality of data elements for retrieval, the plurality of data elements including a first portion of the data residing within a non-relational data store and a second portion of the data residing within a relational data store;
a query optimizer to optimize the database query to include a join operation specifying a plurality of sub-queries to join the first portion of the data and the second portion of the data into a joined data set responsive to the request;
wherein the query optimizer is to further: (i) identify a first sub-query to a table within the relational data store, corresponding to the first portion of the data for retrieval, (ii) identify a second sub-query to the non-relational data store corresponding to the second portion of the data for retrieval, (iii) replicate the table within the relational data store to the non-relational data store, and (iv) generate the optimized database query with one or more sub-queries to fetch both the first portion of the data for retrieval and the second portion of the data for retrieval from the non-relational data store; and
wherein the query optimizer to (iii) replicate the table within the relational data store to the non-relational data store comprises the query optimizer replicating the table based on a policy to replicate a smaller dataset from its primary location to a location having the larger dataset in fulfillment of the replication; and
wherein the query layer agent is to execute the optimized database query against the database system to retrieve the data.

16. The system of claim 15, wherein the sub-query generator to generate the database query based on the request comprises the sub-query generator to generate a plurality of sub-queries based on the request to fulfill the request, the sub-queries comprising:
a first sub-query to be executed against the non-relational data store, wherein the first sub-query identifies the one or more data elements residing within the non-relational data store;
a second sub-query for execution against the relational data store, wherein the second sub-query determines a data delta between the first sub-query identifies the one or more data elements residing within the non-relational data store and the one or more other data elements residing within the relational data store;
a third sub-query for execution against the relational data store and the non-relational data store, wherein the third sub-query replicates data corresponding to the determined data delta from the relational data store to the non-relational data store; and
a fourth sub-query for execution against the non-relational data store, wherein the fourth sub-query fetches the data for retrieval from the non-relational data store by fetching both the one or more data elements residing within the non-relational data store and the one or more other data elements replicated from the relational data store to the non-relational data store and thus available from within the non- relational data store.

17. The system of claim 15:
wherein the database query comprises a plurality of sub-queries;
wherein at least one of the plurality of sub-queries are directed toward retrieving the one or more data elements residing within the non-relational data store from the non-relational data store; and
wherein at least a second one of the plurality of sub-queries are directed toward retrieving the one or more other data elements residing within the relational data store from the relational data store.

18. The system of claim 15:
wherein the join operation comprises a plurality of sub-queries which are generated based on query optimizations available via the optimizer agent, the query optimizations selected from the group comprising:
a specified ordering for the plurality of sub-queries;
a target data store for execution of a corresponding sub-query;
one or more pre-query assessments based on the data for retrieval;
a replication order from the relational data store to the non-relational data store;
an in-memory join operation specifying at least one or more of the plurality of data elements for retrieval from each of the relational data store and the non-relational data store and placed into memory accessible to the optimizer agent and a corresponding sub-query to retrieve the at least one or more of the plurality of data elements from the memory accessible to the optimizer agent in fulfillment of the request.

19. Non-transitory computer readable storage media having instructions stored thereupon that, when executed by a processor of a database system, the instructions cause the database system to optimize database queries for the database system by performing operations comprising:
receiving a request at a host system for the database system, the request specifying data for retrieval from the database system;
retrieving, based on the request via the host system, one or more locations of the data for retrieval;
generating, at the host system, a database query based on the request, wherein the database query specifies a plurality of data elements for retrieval, the plurality of data elements including a first portion of the data residing within the non- relational data store and a second portion of the data residing within the relational data store;
optimizing the database query to include a join operation specifying a plurality of sub-queries to join the first portion of the data and the second portion of the data into a joined data set responsive to the request;
wherein optimizing the database query further includes:
(i) identifying a first sub-query to a table within the relational data store corresponding to the first portion of the data for retrieval, (ii) identifying a second sub-query to the non-relational data store corresponding to the second portion of the data for retrieval, (iii) replicating the table within the relational data store to the non-relational data store, and (iv) generating the optimized database query with one or more sub-queries to fetch both the first portion of the data for retrieval and the second portion of the data for retrieval from the non-relational data store;

wherein optimizing the database query by (iii) replicating the table within the relational data store to the non-relational data store further comprises optimizing the database query based on a policy to replicate a smaller dataset from its primary location to a location having the larger dataset in fulfillment of the replication; and executing the optimized database query against the database system to retrieve the data.

* * * * *